(12) United States Patent
Mundy

(10) Patent No.: US 11,289,935 B2
(45) Date of Patent: Mar. 29, 2022

(54) BATTERY-BASED POWER DEVICE

(71) Applicant: Luxor Workspaces, LLC, Birmingham, AL (US)

(72) Inventor: Zachariah Mundy, Libertyville, IL (US)

(73) Assignee: Luxor Workspaces, LLC, Birmingham, AL (US)

( * ) Notice: Subject to any disclaimer, the term of this patent is extended or adjusted under 35 U.S.C. 154(b) by 122 days.

(21) Appl. No.: 16/441,584

(22) Filed: Jun. 14, 2019

(65) Prior Publication Data

US 2020/0259357 A1    Aug. 13, 2020

Related U.S. Application Data

(63) Continuation-in-part of application No. 29/679,836, filed on Feb. 11, 2019.

(51) Int. Cl.
*H02J 7/02*     (2016.01)
*H01M 10/0525*  (2010.01)
*F21V 23/02*    (2006.01)

(52) U.S. Cl.
CPC ............ *H02J 7/025* (2013.01); *F21V 23/023* (2013.01); *H01M 10/0525* (2013.01)

(58) Field of Classification Search
CPC ....................................................... H02J 7/00
See application file for complete search history.

(56) References Cited

U.S. PATENT DOCUMENTS

| 8,596,588 B1 | 12/2013 | Sikkema et al. |
| 8,920,191 B2 | 12/2014 | Carpanzano |
| 10,181,735 B2 | 1/2019 | Byrne et al. |
| 2007/0273325 A1 | 11/2007 | Krieger et al. |
| 2008/0185990 A1 | 8/2008 | Hsu |
| 2014/0030910 A1* | 1/2014 | Carpanzano ......... H01R 25/006 439/501 |
| 2016/0093926 A1 | 3/2016 | Wright |

(Continued)

FOREIGN PATENT DOCUMENTS

| CA | 2960239 | 9/2017 |
| CA | 2998630 | 9/2018 |
| MX | 2017003091 | 8/2018 |

OTHER PUBLICATIONS

"Juice Mobile Power", Bretford Manufacturing, Inc., 2017.

(Continued)

*Primary Examiner* — Robert Grant
(74) *Attorney, Agent, or Firm* — Bradley Arant Boult Cummings LLP

(57) ABSTRACT

A battery-based wireless power device for clamping onto a furniture article is provided. The battery-based wireless power device includes an upper housing having an electrical connector, such as an AC outlet or USB plug, and a lower housing operatively connected to the upper housing. The upper housing and the lower housing are positioned substantially parallel to one another and define a mounting cavity therebetween configured for removable attachment to an edge of the furniture article. The battery-powered device provides power through the use of a self-contained electrical power source, such as a rechargeable battery. The rechargeable battery can be removed, replaced with a charged battery, and recharged for later use.

20 Claims, 19 Drawing Sheets

(56) References Cited

U.S. PATENT DOCUMENTS

| | | | |
|---|---|---|---|
| 2016/0197504 A1 | 7/2016 | Hsia et al. | |
| 2016/0268825 A1* | 9/2016 | Byrne | H02J 7/0042 |
| 2017/0264120 A1* | 9/2017 | Byrne | H01R 13/6675 |
| 2018/0277804 A1 | 9/2018 | Lee et al. | |
| 2018/0358765 A1* | 12/2018 | Byrne | H02J 7/00 |
| 2019/0027874 A1 | 1/2019 | Byrne et al. | |

OTHER PUBLICATIONS

Australian Examination Report dated Aug. 31, 2020 of corresponding Australian Patent Application No. 2020200524.
Australian Examination Report dated Dec. 18, 2020 of corresponding Australian Patent Application No. 2020200524.

* cited by examiner

BATTERY-BASED POWER DEVICE

FIELD OF THE DISCLOSURE

The present disclosure relates generally to electrical power sources. More particularly, the disclosure relates to a battery-powered wireless device for providing electricity at desks and workstations.

BACKGROUND

With the average worker and student utilizing at least two devices (e.g., a phone and a tablet or laptop), there is a growing need to provide power to users for their electronic devices. In today's workspaces, the work environment has become more active and mobile. Businesses are increasingly offering fewer offices and favoring more open office environments with conference and collaboration areas having movable, mobile furniture. Similarly, in classrooms where active learning initiatives are becoming increasingly more common, there is a rise in mobile desks and collaboration tables.

With mobile workspaces becoming more popular and with increasing demands for providing power to more devices, the requirements for power have increased considerably. However, options for making power mobile are relatively non-existent. The options that do exist today require connecting multiple extension cords, power strips, and a large mass of wires running around a room. Overloaded power circuits, unsafe wires creating tripping hazards, and damage to devices when wires are tripped on and pulled on are among the nuisances in today's work environments.

Accordingly, there remains a need in the art for a solution that provides wireless power to a mobile desk or workstation without the need for extension cords, power strips, and unsafe wires.

SUMMARY

The present disclosure provides a battery-based wireless power device for clamping onto a furniture article, including an upper housing defining an interior region, the interior region including at least one electrical connector mounted therein and accessible from outside the upper housing; a lower housing operatively connected to the upper housing, wherein the upper housing and the lower housing are positioned substantially parallel to one another and define a mounting cavity therebetween configured for removable attachment to an edge of the furniture article, a compartment defined within the lower housing for receiving a rechargeable electrical power source, the compartment including a plurality of electrical contacts operably connected to the at least one electrical connector, wherein the upper housing and the lower housing are adjustable in a first clamping direction toward a surface of the furniture article and in a second opposite clamping direction away from the surface of the furniture article by at least one rotatable holding member that extends upward from the lower housing to the upper housing. In one embodiment, the at least one electrical connector includes an AC outlet, a USB-C plug, a USB-A plug, or combinations thereof. In another embodiment, the interior region further includes at least one of a power button or a power indicator light mounted therein.

In this aspect, the compartment includes an opening for receiving the rechargeable electrical power source, the opening having an exterior frame, wherein the exterior frame includes at least one corner having an alignment notch. In another embodiment, the mounting cavity has a height of about 2 inches or less. In still another embodiment, the at least one rotatable holding member is a threaded screw or bolt having a hex-shaped head configured for engagement by a wrench. In yet another embodiment, the at least one electrical connector is operatively connected to a printed circuit board (PCB) and the PCB is operatively connected to the plurality of electrical contacts.

The present disclosure also provides a battery-based wireless power device for clamping onto a furniture article, including an upper housing defining an interior region, the interior region including at least one electrical connector mounted therein and accessible from outside the upper housing, wherein the at least one electrical connector includes an AC outlet, a USB-C plug, a USB-A plug, or combinations thereof; a lower housing operatively connected to the upper housing, wherein the upper housing and the lower housing are positioned substantially parallel to one another and define a mounting cavity therebetween configured for removable attachment to an edge of the furniture article, a compartment defined within the lower housing, the compartment having an opening for receiving a rechargeable electrical power source, wherein the compartment comprises a plurality of electrical contacts operably connected to the at least one electrical connector, wherein the lower housing and the upper housing are made adjustable for clamping onto the edge of the furniture article by use of at least one rotatable tightening screw, wherein, upon rotation in a first rotational direction, the at least one rotatable tightening screw is configured to move longitudinally in a first clamping direction toward a surface of the furniture article and, upon rotation in a second rotational direction, the at least one rotatable tightening screw is configured to move longitudinally in a second clamping direction away from the surface of the furniture article.

In this aspect, the interior region may further include a power button and a power indicator light mounted therein, wherein the power indicator light is a light-emitting diode (LED), a light, or a digital readout. In another embodiment, the plurality of electrical contacts in the compartment are operably connected to the at least one electrical connector by a power cord or bus. In still another embodiment, the lower housing and the upper housing are operatively connected by at least two rotatable tightening screws and the at least two rotatable tightening screws extend upward through the lower housing and the upper housing. In yet another embodiment, the opening has an exterior frame including at least one corner having an alignment notch. In another embodiment, the mounting cavity has a height of about 1.5 inches or less. In still another embodiment, the plurality of electrical contacts are positioned on an interior surface of the compartment opposing the opening.

The present disclosure further provides a kit for providing wireless power at a furniture article, including any of the battery-based wireless power devices described above and at least one rechargeable battery. In one embodiment, the rechargeable battery is a lithium ion battery. In another embodiment, the rechargeable battery includes a plurality of electrical contact points configured to operably connect to the plurality of electrical contacts in the compartment. In still another embodiment, the kit may further include a battery charger configured to support and recharge the at least one rechargeable battery. In this aspect, the battery charger may be a multi-bay battery charger configured to support and recharge a plurality of rechargeable batteries.

Moreover, the present disclosure also provides for a battery-based wireless power device for attachment onto a furniture article, including a housing defining an interior region, the interior region comprising at least one electrical connector mounted therein and accessible from outside the housing, a compartment defined within the housing for receiving a rechargeable electrical power source, the compartment comprising a plurality of electrical contacts operably connected to the at least one electrical connector, one or more brackets operably attached to the housing and configured for removable attachment to an edge of the furniture article, wherein the one or more brackets are configured for attachment to the edge of the furniture article by at least one rotatable holding member.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

Spatially relative terms, such as "under," "below," "lower," "over," "upper," and the like, may be used herein for ease of description to describe one element or feature's relationship to another when the apparatus is right side up as shown in the accompanying drawings.

The present disclosure provides a battery-based wireless power device for providing a power source at desks and other workstations. The battery-powered device may be designed as a clamp and may be mounted on a variety of different furniture articles, such as desks, tables, lecterns, laptop stands, chairs, countertops, or any other furniture article where a self-contained power source is desired. The battery-based wireless power device dispenses of the need for voluminous wires, extension cords, and power strips and the need for furniture to be positioned near wall outlets or other wired power sources. The battery-powered device provides power through the use of a self-contained electrical power source, such as a rechargeable battery. The rechargeable battery can be removed, replaced with a charged battery, and recharged for later use.

Figure 1:
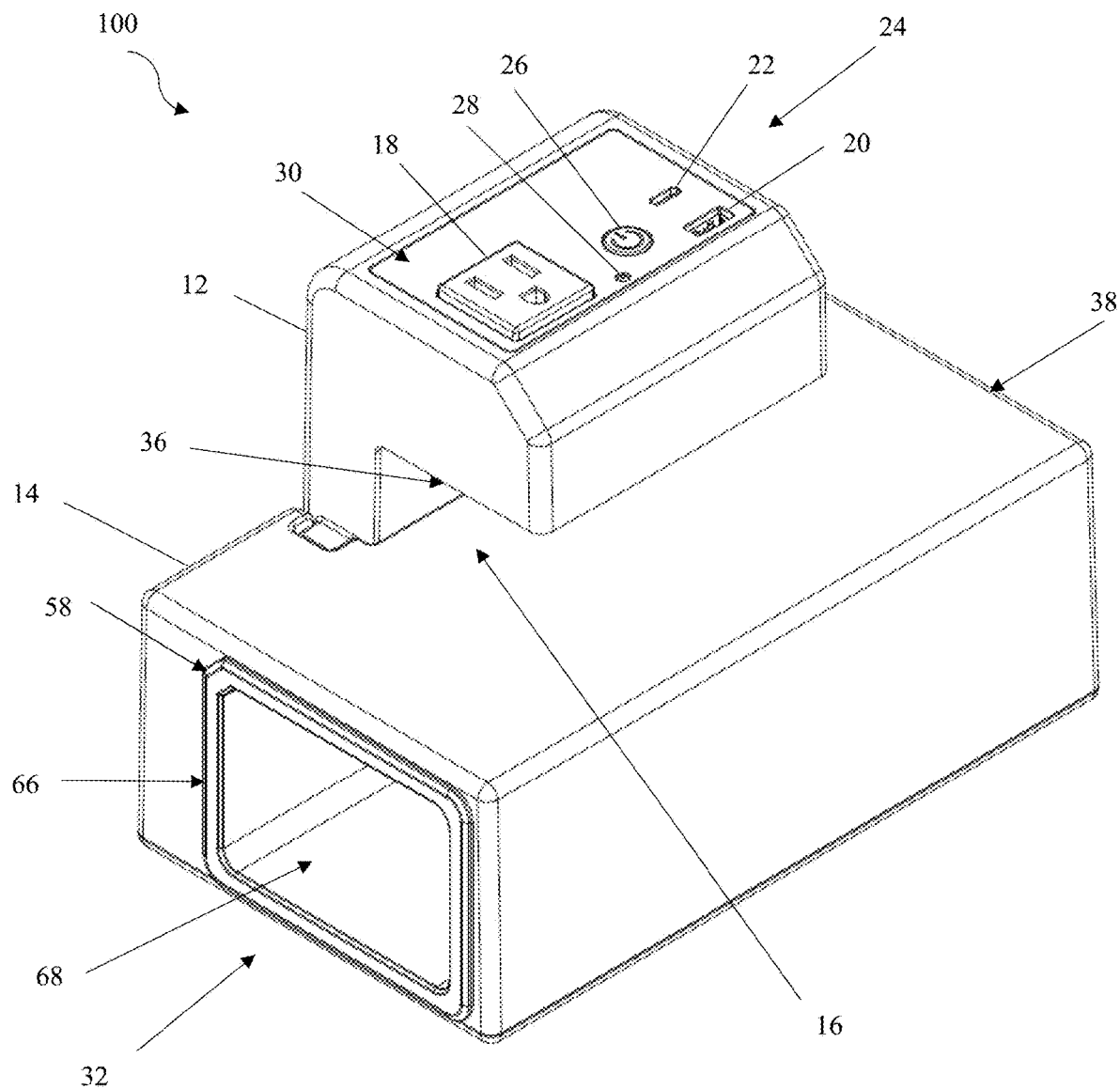
FIG. 1 is a right perspective view of a battery-based wireless power device in accordance with an embodiment of the present disclosure.

FIG. 1 is a right perspective view of a battery-based wireless power device 100 according to an exemplary embodiment of the present disclosure. The battery-based wireless power device 100 comprises an upper housing 12 and a lower housing 14 that act as upper and lower clamping members, respectively. The upper housing 12 is operatively attached to the lower housing 14 such that the upper housing 12 and the lower housing 14 are in an opposed, essentially parallel relationship to each other. The upper housing 12 and the lower housing 14 define a mounting cavity 16 therebetween that is configured to fit the side edge or lip of a furniture article. The height of the mounting cavity 16 (i.e., the vertical distance between the bottom surface 36 of the upper housing 12 and the top surface 38 of the lower housing 14) may vary depending on the thickness of the edge of the furniture article to which the battery-based wireless power device 100 is to be clamped. In one embodiment, the height of the mounting cavity 16 may be about 2 inches or less so as to fit any surface of up to 2 inches in thickness. In another embodiment, the height of the mounting cavity 16 may be about 1.75 inches or less. In still another embodiment, the height of the mounting cavity may be about 1.5 inches or less.

The upper housing 12 and the lower housing 14 may generally be of any dimension, size, or shape provided that the upper housing 12 and the lower housing 14 are large enough to define a mounting cavity 16 suitable for receiving the side edge or lip of the furniture article. In one embodiment, as illustrated in FIG. 1, the upper housing 12 has a generally inverted L-shaped cross section, while the lower housing 14 has a generally rectangular shape. In this aspect, when the upper housing 12 is operatively connected to the lower housing 14, the upper housing 12 and the lower housing 14 form a clamp having a generally C-shaped cross section. The upper housing 12 and the lower housing 14 may be formed from any suitable rigid material such as aluminum, stainless steel, or plastic.

The upper housing 12 defines an interior region that supports one or more electrical connectors 24 for supplying power to portable electronic devices. The electrical connectors 24 may be positioned at any location on the upper housing 12 so long as the electrical connectors 24 are accessible from outside the upper housing 12. For instance, as shown in FIG. 1, the electrical connectors 24 may be positioned on a top surface 30 of the upper housing 12 so that portable electronic devices, such as mobile phones, electronic media players, laptops, and tablets, can be readily sourced with power while they are resting on top of the furniture article. In one embodiment, portable electronic devices may be sourced with power through a direct electrical connection using a charging cord and a compatible plug for engagement with one of the electrical connectors 24.

The upper housing 12 may include one or more electrical connectors 24 of the same or different type to provide access to electrical power for a variety of different devices. For example, in the illustrated embodiment, the upper housing 12 supports three different types of electrical connectors 24. As shown in FIG. 1, the upper housing 12 supports an AC outlet 18, a USB-A plug 20, and a USB-C plug 22. However, the electrical connectors 24 may be of any type including, but not limited to, USB connectors, USB-C connectors, mini-USB connectors, micro-USB connectors, AC power outlets, and any round or coaxial receptacles or ports. The configuration of the electrical connectors 24 on the upper housing 12 may vary so long as the electrical connectors 24 are readily accessible by the user. In one embodiment, the AC outlet 18 may be a separate component that is mounted onto the upper housing 12 (as shown in FIG. 1). In another embodiment, the AC outlet 18 may be integral with the upper housing 12 (as shown in FIG. 2).

The upper housing 12 may also support a power button 26. The power button 26 may be any suitable device to turn the battery-based wireless power device 100 on in any suitable manner (for example, pressing the power button 26, touching the power button 26, or switching the power button 26 on). A power indicator light 28 may be supported on the upper housing 12. The power indicator light 28 provides a visual feedback to the user of the powered state of the battery-based wireless power device 100. The power indicator light 28 illuminates only when the power button 26 is actuated and electricity is being supplied to the electrical connectors 24. The power indicator light 28 may be a light-emitting diode (LED), a light, a digital readout, or other known means. In one embodiment, the power indicator light 28 is a LED. In another embodiment, the power indicator light 28 includes a plurality of LEDs having different colors to indicate the amount of charge. For example, the power indicator light 28 may comprise green, yellow, and red LEDs corresponding to full charge, weakening charge, and zero charge/replace, respectively.

Figure 2:
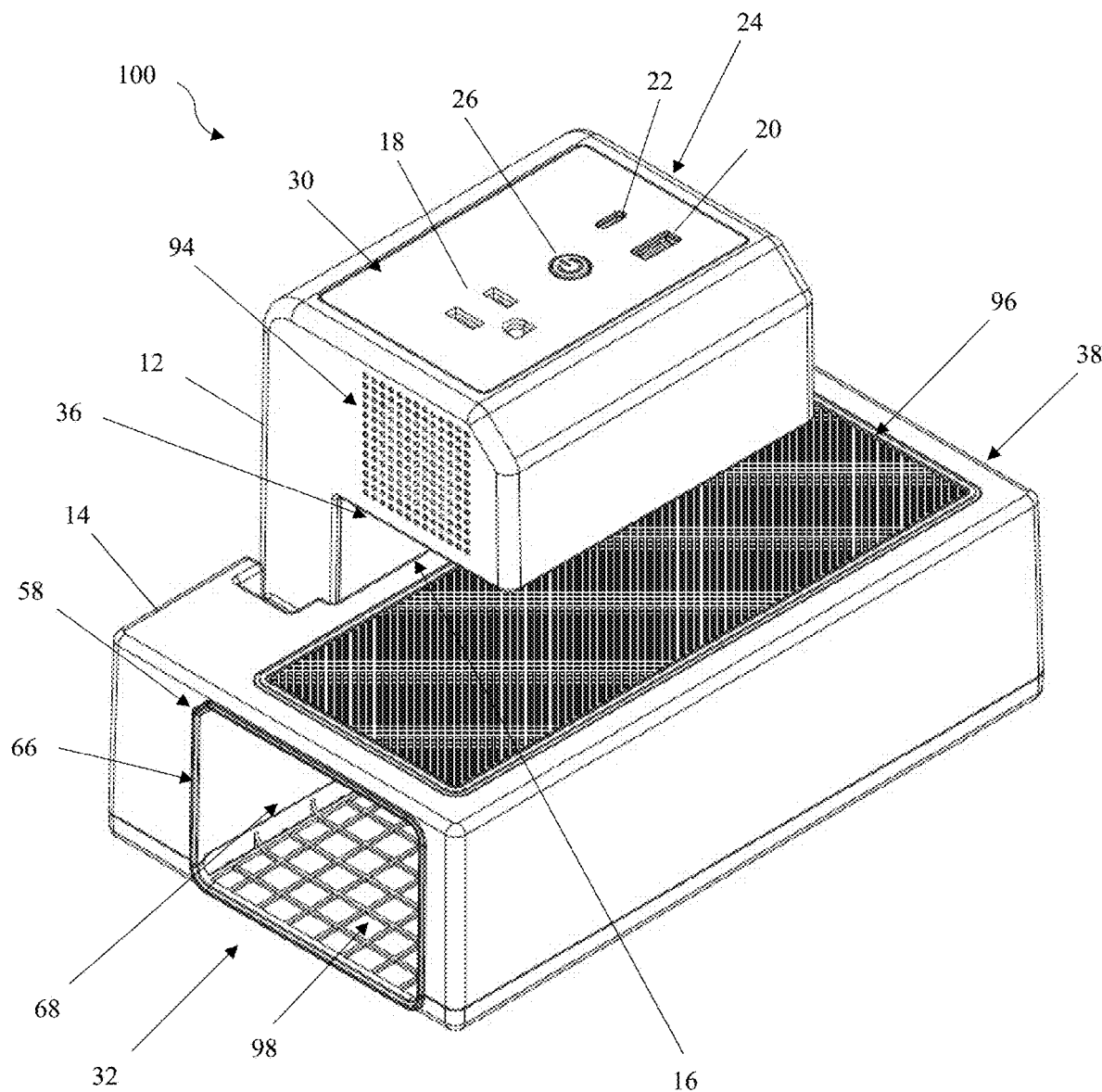
FIG. 2 is a right perspective view of the battery-based wireless power device according to another embodiment of the present disclosure.

FIG. 2 is a right perspective view of a battery-based wireless power device 100 according to another embodiment of the present disclosure. In one embodiment, the upper housing 12 may include one or more ventilation holes 94 and an internal fan (not shown) to allow air to circulate through the upper housing 12 and the lower housing 14. The ventilation holes help to prevent electronics situated within the upper housing 12 and the lower housing 14 from overheating. The ventilation holes may be placed anywhere along the surface of the upper housing 12. For instance, the ventilation holes may be located on the left and right sides of the upper housing 12 to promote air flow around the internal circuitry situated therein.

The lower housing 14 engages the lower surface of the furniture article. The lower housing 14 includes an interior compartment 32 having at least one opening 68 for receiving and supporting a rechargeable electrical power source, such as a rechargeable battery (not shown). The opening 68 should be accessible from the outside so that the rechargeable electrical power source may be easily inserted and removed. The shape and dimensions of the compartment 32 may vary so long as the compartment 32 is large enough to fit a rechargeable electrical power source. In the illustrated embodiment, the compartment 32 and opening 68 are generally rectangular in shape in order to receive a rectangular rechargeable electrical power source. The compartment 32 may also include a frame 66 along the exterior perimeter of the opening 68. In one embodiment, the frame 66 may include one or more alignment notches 58. The alignment notch 58 helps direct the rechargeable electrical power source into the compartment 32 and ensures that the rechargeable electrical power source is properly inserted. The alignment notch 58 also prevents the insertion of rechargeable electrical power sources that are not compatible with the battery-based wireless power device 100.

The size of the upper housing 12 and the lower housing 14 may vary so long as the battery-based wireless power device 100 is capable of being mounted onto a furniture article and providing electrical power. In an exemplary embodiment, the lower housing 14 may have a length of about 6 inches to about 12 inches. In another embodiment, the lower housing 14 may have a length of about 8 inches to about 10 inches. The lower housing 14 may have a height of about 1.5 inches to about 5 inches. In another embodiment, the lower housing 14 may have a height of about 2 inches to about 4 inches. The lower housing 14 may have a depth of about 2 inches to about 6 inches. In another embodiment, the lower housing 14 may have a depth of about 3 inches to about 5 inches. The size of the compartment 32 can be adjusted to fit varying sizes of rechargeable electrical power sources. However, one of ordinary skill in the art will recognize that the exemplary dimensions provided herein are for illustrative purposes, and that exemplary battery-based wireless power devices are not limited to the illustrative dimensions.

Figure 3:
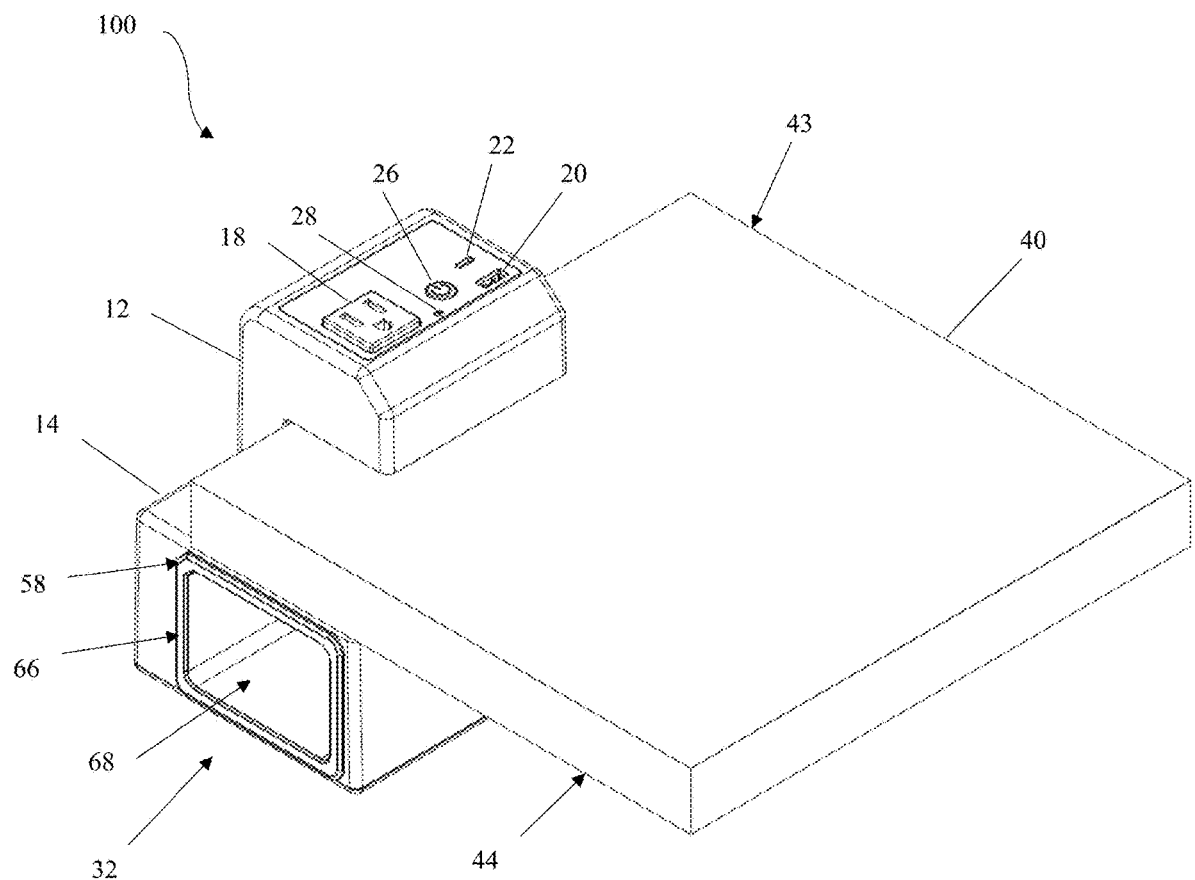
FIG. 3 depicts the battery-based wireless power device of FIG. 1 clamped onto a furniture article.

FIG. 3 is a right perspective view of the battery-based wireless power device 100 clamped onto a furniture article 40, such as a table or desk. When the battery-based wireless power device 100 is clamped onto the furniture article 40, the upper housing 12 is positioned proximate to and engages an upper surface 43 of the furniture article 40 and the lower housing 14 is positioned proximate to and engages a lower surface 44 of the furniture article 40. As shown in FIG. 2, the upper housing 12 and lower housing 14 may optionally include protective padding 96 along the inner surfaces to protect the furniture article 40 from any damage, such as scratches or dents. The protective padding 96 may also include a gripping material or anti-slip material to prevent the battery-based wireless power device 100 from sliding or moving. Similarly, the compartment 32 may include a gripping material 98 to help secure the rechargeable electrical power source, such as a rechargeable battery (not shown), within the compartment.

Figure 4:
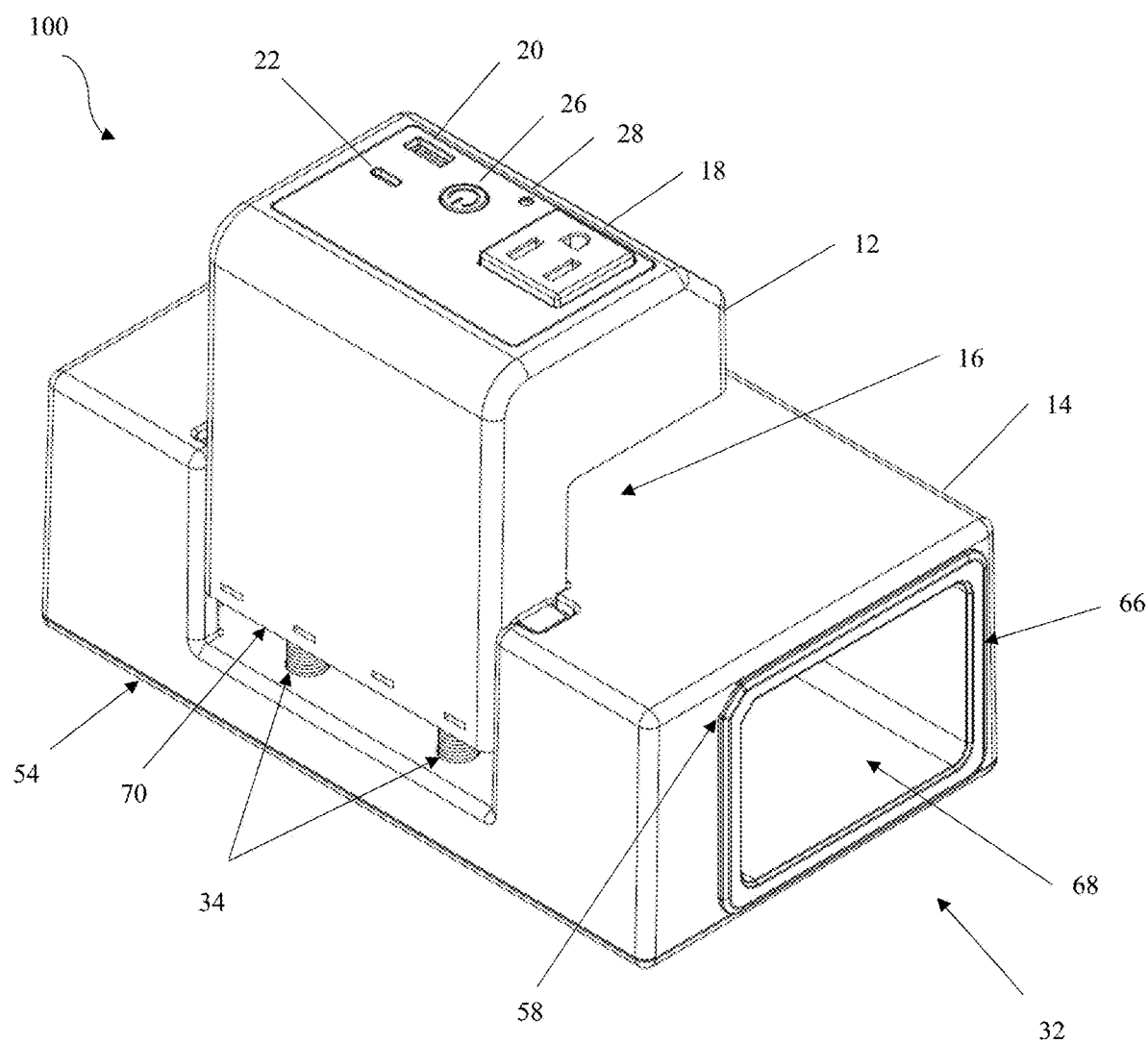
FIG. 4 is a left perspective view of the battery-based wireless power device according to one embodiment.

FIG. 4 is a left perspective view of the battery-based wireless power device 100 showing the attachment of the upper housing 12 to the lower housing 14 according to one embodiment. As can be seen in FIG. 4, the upper housing 12 is operatively connected to the lower housing 14 via one or more holding members 34. To secure the lower housing 14 to the upper housing 12, the holding members 34 are inserted through one or more holes (not shown) in a bottom surface 54 of the lower housing 14 and are driven up into one or more holes (not shown) in a bottom surface 70 of the upper housing 12. The holding members 34 may have threaded shafts that rotatably engage threaded holes (not shown) in the lower housing 14 and threaded holes (not shown) in the upper housing 12. In the illustrated embodiment, the holding members 34 are threaded bolts. However, the holding members 34 may include any type of securing means, such as screws, pins, rods, and projections.

Figure 5:
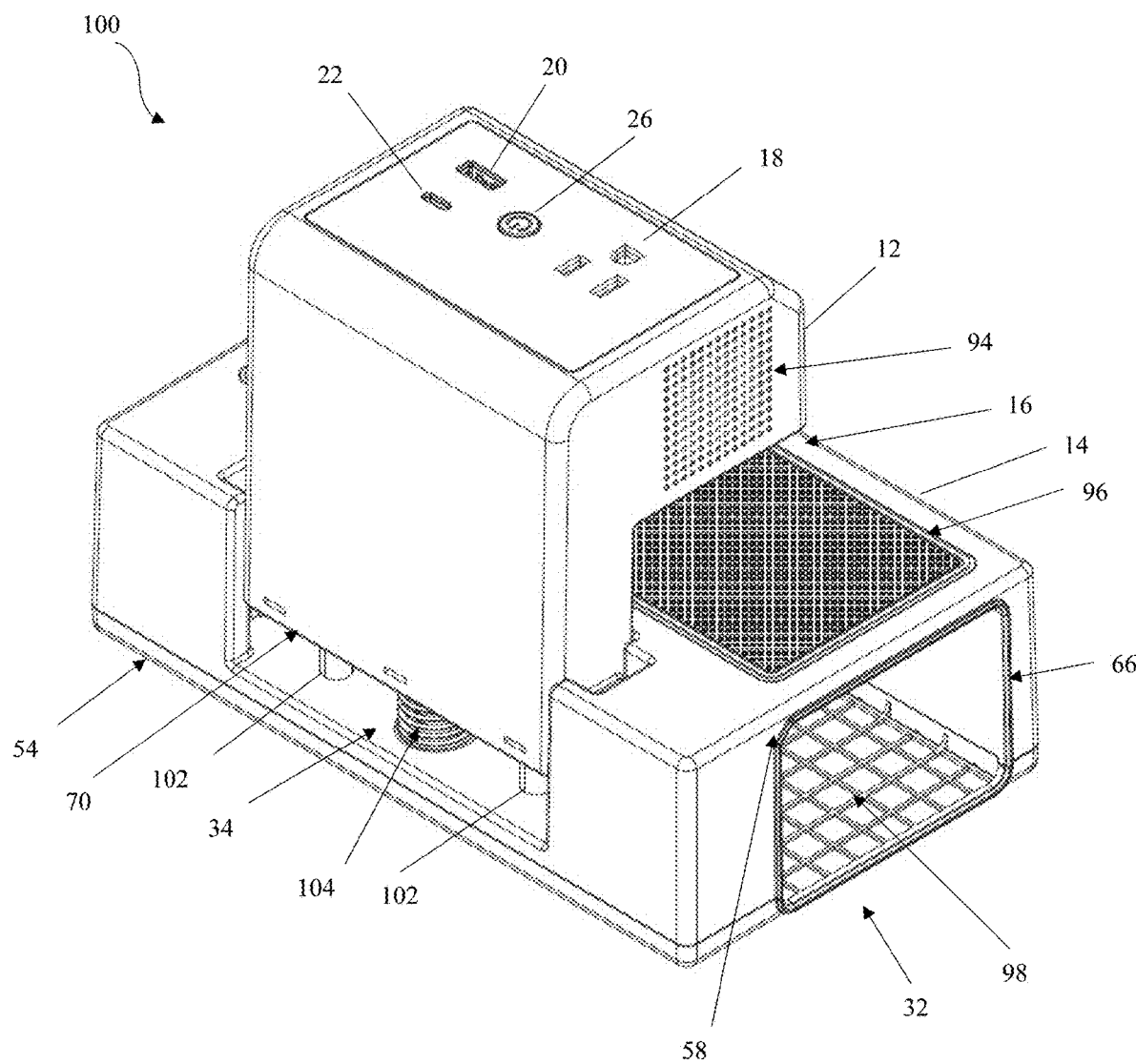
FIG. 5 is a left perspective view of the battery-based wireless power device according to another embodiment.

FIG. 5 is a left perspective view of the battery-based wireless power device 100 showing the attachment of the upper housing 12 to the lower housing 14 according to another embodiment. As shown in FIG. 5, the upper housing 12 is operatively connected to the lower housing 14 via a single holding member 34 and two guide posts 102. To secure the lower housing 14 to the upper housing 12, the holding member 34 and the guide posts 102 are inserted through holes (not shown) in the bottom surface 54 of the lower housing 14 and are driven up into holes (not shown) in the bottom surface 70 of the upper housing 12. In one embodiment, the holding member 34 may include a spring 104 positioned on the exterior of the holding member 34. The spring 104 helps to keep the battery-based wireless power device 100 forced open while not in use. The spring 104 also helps to keep the battery-based wireless power device 100 forced open during installation onto the furniture article 40.

Figure 6:
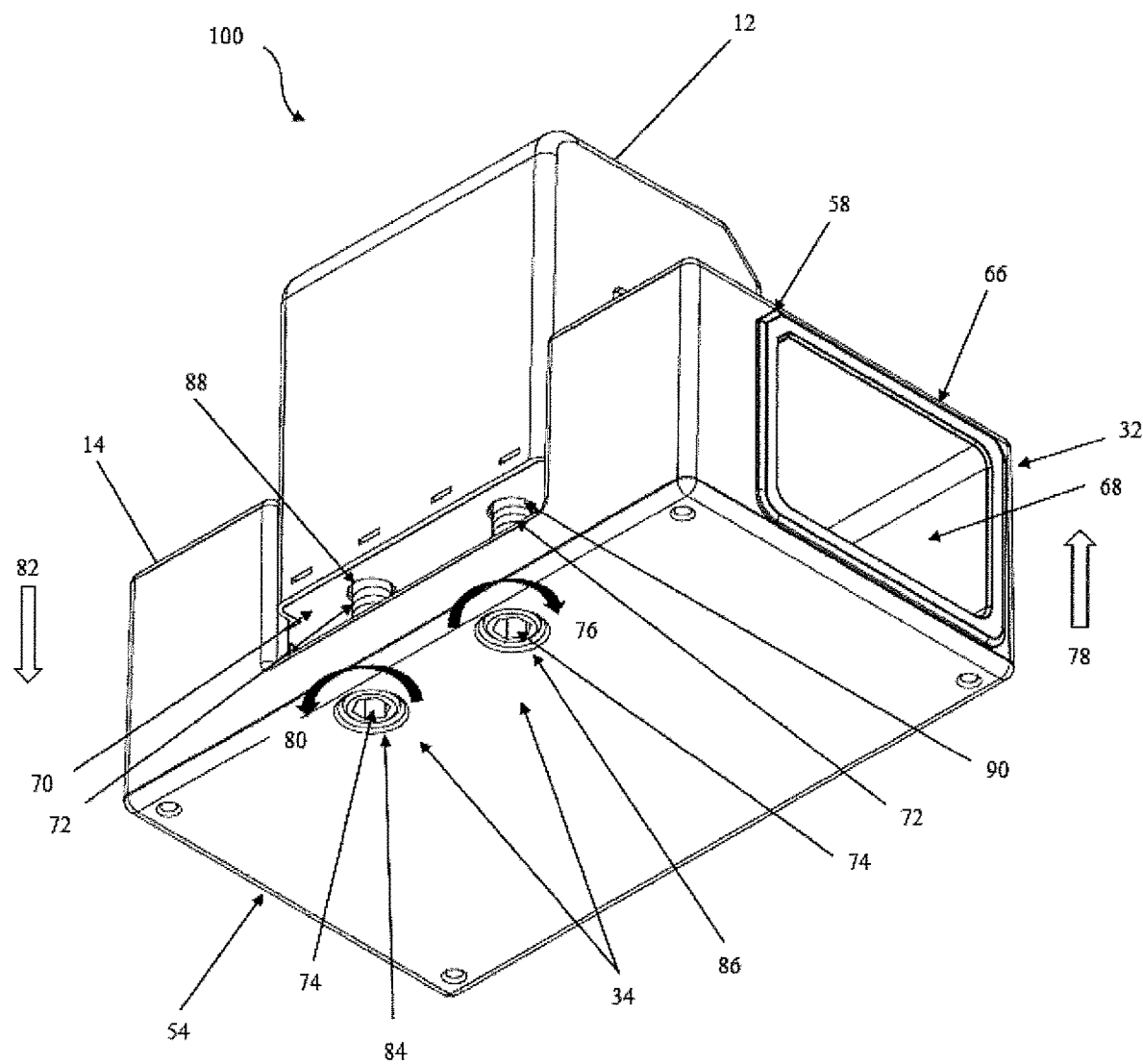
FIG. 6 is a bottom perspective view of the battery-based wireless power device of FIG. 1.

FIG. 6 is a bottom perspective view of the battery-based wireless power device 100 showing the holding members 34 and the mechanism by which the battery-based wireless power device 100 clamps onto the edge or lip of the furniture article according to one embodiment. As shown in FIG. 6, threaded shafts 72 of the holding members 34 rotatably engage threaded holes 84, 86 in the bottom surface 54 of the lower housing 14 and threaded holes 88, 90 in the bottom surface 70 of the upper housing 12. Each of the threaded shafts 72 of the holding members 34 have a bottom head 74 that is adapted for turning and securing the battery-based wireless power device 100 to the furniture article 40. For example, the bottom head 74 may include an outer hex-shaped head for engagement by a wrench. In this aspect, the outer hex-shaped head may have a special shape or design that is accessible for turning only by a special tool or wrench, which can help prevent theft of the battery-based wireless power device 100. In another embodiment, the bottom head 74 may include an inner hex-shaped socket for engagement by an Allen wrench. In still another embodiment, the bottom head 74 may have an outer finger-graspable surface.

Rotation of the bottom heads 74 of the holding members 34 results in the adjustment of the upper housing 12 and the lower housing 14 such that, upon tightening of the holding members 34, the battery-based wireless power device 100 clamps onto the edge of the furniture article 40. As each of the bottom heads 74 are rotated in a first rotational direction 76, the holding members 34 move longitudinally in a first clamping direction 78 for clamping of the edge of the furniture article therebetween. In other words, as the holding members 34 are tightened and move in the first clamping direction 78, the upper housing 12 and the lower housing 14 are secured to the upper surface 43 and the lower surface 44 of the furniture article 40, respectively. When each of the bottom heads 74 are rotated in an opposite second rotational direction 80, the holding members 34 move longitudinally in a second clamping direction 82 for unclamping. That is, as the holding members 34 are loosened and move in the second clamping direction 82, the upper housing 12 and the lower housing 14 are released from the upper surface 43 and the lower surface 44 of the furniture article 40, respectively. The first rotational direction 76 and the opposite second rotational direction 80 are illustrated here by example and without limitation for standard right-hand or clockwise operation. The first rotational direction 76 and the opposite second rotational direction 80 may optionally be reversed for left-hand or counterclockwise operation.

In one embodiment, the battery-based wireless power device 100 includes a rechargeable electrical power source. The rechargeable electrical power source is supported within the compartment 32 in the lower housing 14 and provides a source of electrical energy at the furniture article 40, which dispenses of the need for extension cords and power strips and the need for furniture to be positioned near wall outlets or other wired power sources. In one embodiment, the rechargeable electrical power source may be a rechargeable battery.

Figure 7A:
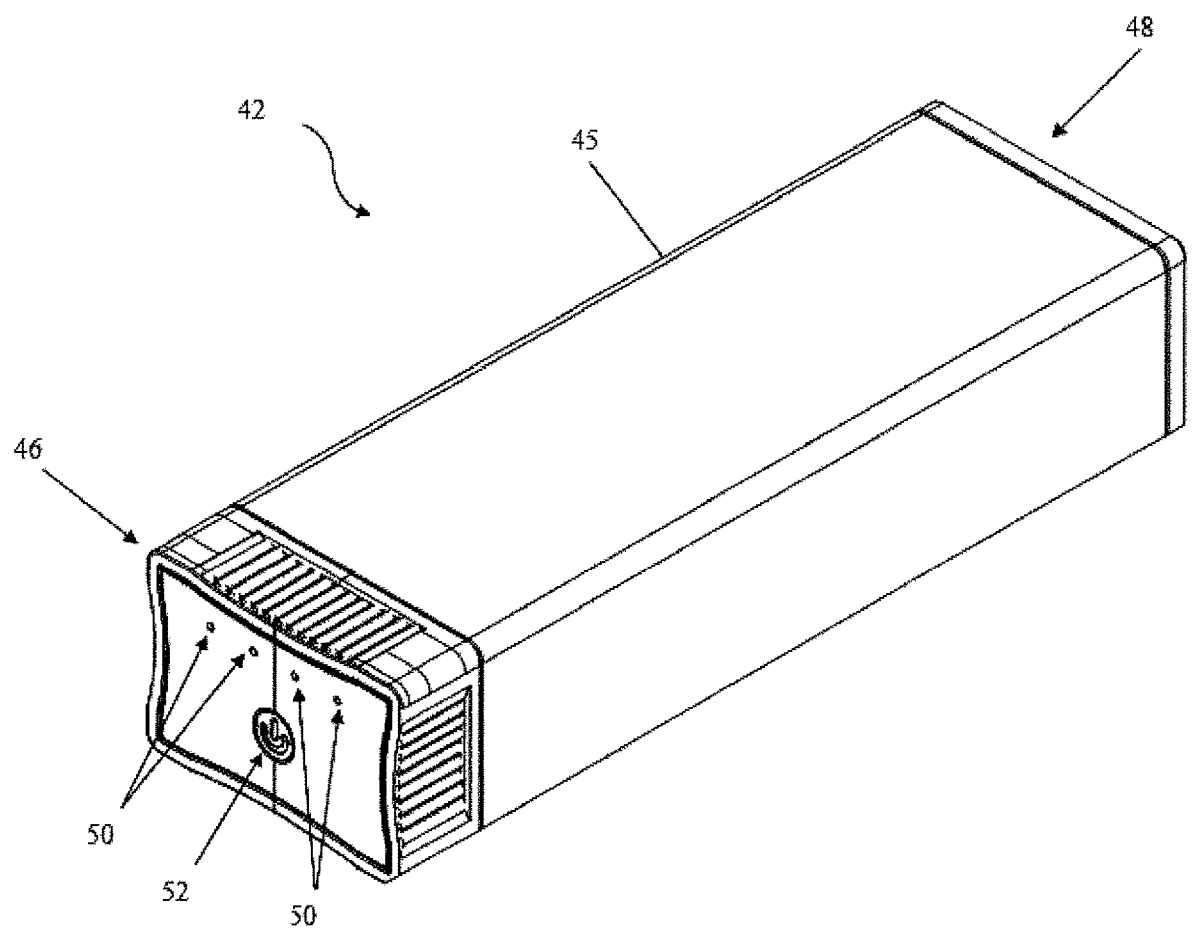
FIG. 7A is a front perspective view of a rechargeable battery in accordance with an exemplary embodiment of the present disclosure.
Figure 7B:
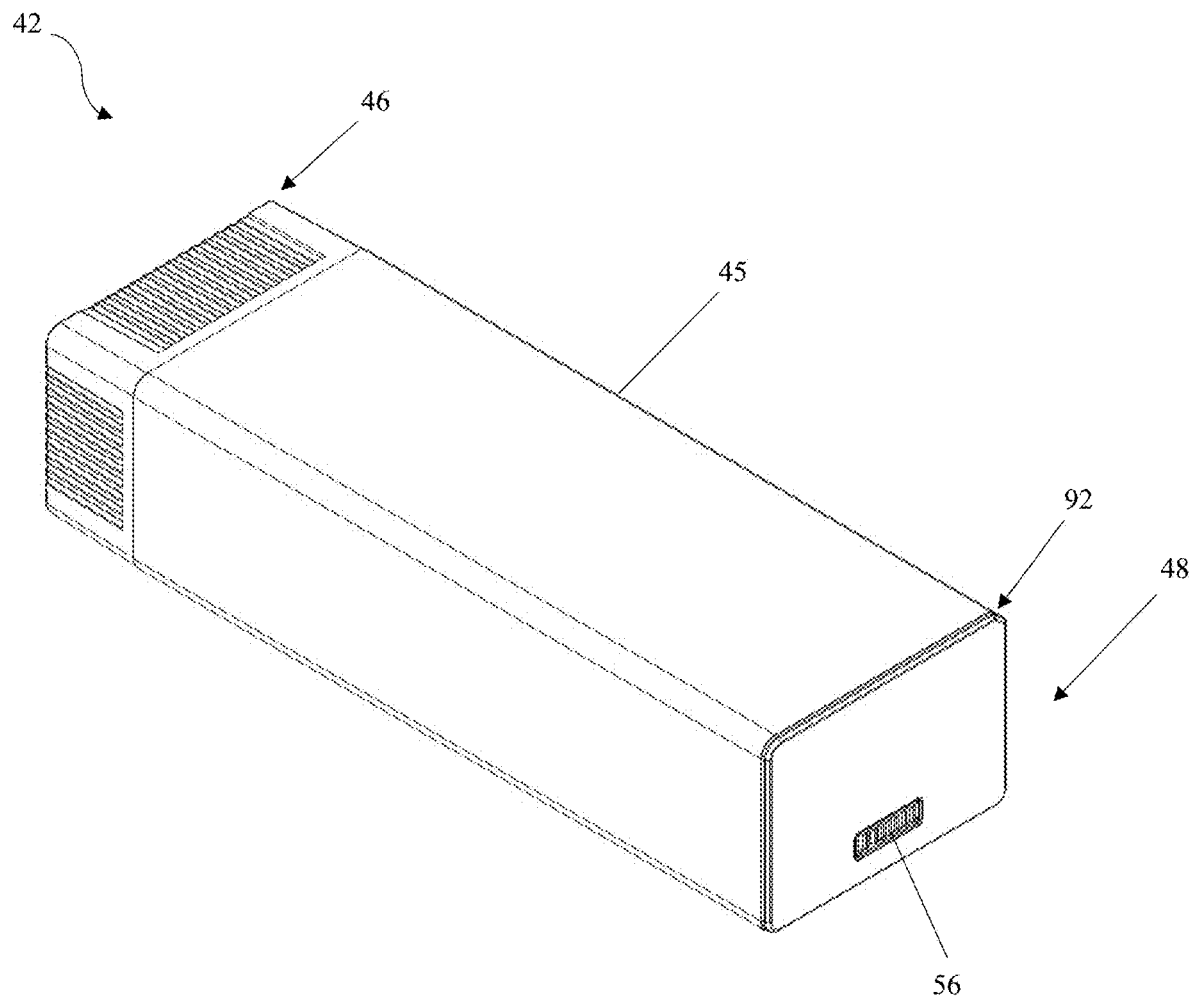
FIG. 7B is a rear perspective view of the rechargeable battery of FIG. 7A.

FIGS. 7A and 7B are front and rear perspective views, respectively, of a rechargeable battery 42 in accordance with an exemplary embodiment of the present disclosure. The rechargeable battery 42 may be any type of portable battery that is capable of being recharged for later use. Suitable types of rechargeable batteries 42 include, but are not limited to, nickel cadmium batteries, nickel-metal hydride batteries, lead acid batteries, lithium ion batteries, and lithium ion polymer batteries. In one embodiment, the rechargeable battery 42 is a lithium ion battery. The rechargeable battery 42 may have any wattage suitable to provide sufficient power to the battery-based wireless device 100. In this aspect, the rechargeable battery 42 may have a Watt-hour rated capacity of 100 or greater. In another embodiment, the rechargeable battery 42 may have a Watt-hour rated capacity of 145 or greater. The rechargeable battery 42 may also have an internal monitoring system to prevent the rechargeable battery 42 from over or under charging.

As shown in FIG. 7A, the rechargeable battery 42 includes an outer housing 45 having a front end 46 and a back end 48. In the illustrated embodiment, the outer housing 45 is rectangular in shape. The shape and size of the outer housing 45 may vary; however, the shape and size of the outer housing 45 should generally correspond to the shape and size of the compartment 32 in the lower housing 14 so that the rechargeable battery 42 fits within the compartment 32. The front end 46 comprises a plurality of charge indicator lights 50. The charge indicator lights 50 are placed in mechanical communication with the rechargeable battery 42 and provide the user with an easy to read display of the power currently remaining in the rechargeable battery 42. Accordingly, the user can determine, for example, whether he needs to charge the rechargeable battery 42, if the rechargeable battery 42 has previously been charged, if the user should switch out the rechargeable battery 42 with another having more power remaining, or if the user should bring along an additional rechargeable battery 42 should the current rechargeable battery 42 run out of power during use. The charge indicator lights 50 may be a LED, a light, a digital readout, or other known means. In one embodiment, the charge indicator lights 50 are LEDs. For example, the charge indicator lights 50 may comprise a plurality of different colored LEDs to indicate the varying amounts of charge remaining. In the illustrated embodiment, the outer housing 45 includes four charge indicator lights 50 to represent the varying power levels in the rechargeable battery 42. However, any number of charge indicator lights 50 may be used on the rechargeable battery 42. In another embodiment, the front end 46 may include a meter that indicates the amount of power remaining in the rechargeable battery 42. In still another embodiment, the front end 46 may include a display unit showing the amount of charge remaining as a number or percentage.

The front end 46 also comprises a power button 52. Like the power button 26 on the upper housing 12, the power button 52 may be any suitable device to turn on the rechargeable battery 42 in any suitable manner (for example, pressing the power button 52, touching the power button 52, or switching on the power button 52). When the power button 52 is actuated, the rechargeable battery 42 is turned on and can provide power to the battery-based wireless power device 100. The power button 52 can also be used to determine the charge status and restart the rechargeable battery 42.

The back end 48 of the rechargeable battery 42, as shown in FIG. 7B, is configured for insertion into the compartment 32 of the lower housing 14. Each corner of the back end 48 aligns with the corners of the frame 66 of the compartment 32 for insertion into the battery-based wireless power device 100. In one embodiment, the back end 48 of the rechargeable battery 42 may include one or more corners having an alignment notch 92 that is complementary in shape to the alignment notch 58 on the frame 66. This ensures that the rechargeable battery 42 is properly inserted into the compartment 32 and that the rechargeable battery 42 is compatible for use in the battery-based wireless power device 100.

The back end 48 of the rechargeable battery 42 also includes a plurality of electrical contact points 56. The electrical contact points 56 may be made out of any conducting material. In one embodiment, the plurality of electrical contact points 56 may operatively connect to electrical contacts on a battery charger (not shown) to replenish the charge of the rechargeable battery 42. In another embodiment, the plurality of electrical contact points 56 may operatively connect to electrical contacts (not shown) within the upper housing 12 or the lower housing 14 to supply power to the battery-based wireless power device 100. While the plurality of electrical contact points 56 are illustrated on the back end 48, the electrical contact points 56 may be positioned at any location on the rechargeable battery 42 so long as the electrical contact points 56 are operable to connect to opposing electrical contacts within the battery-based wireless power device 100.

Figure 8:
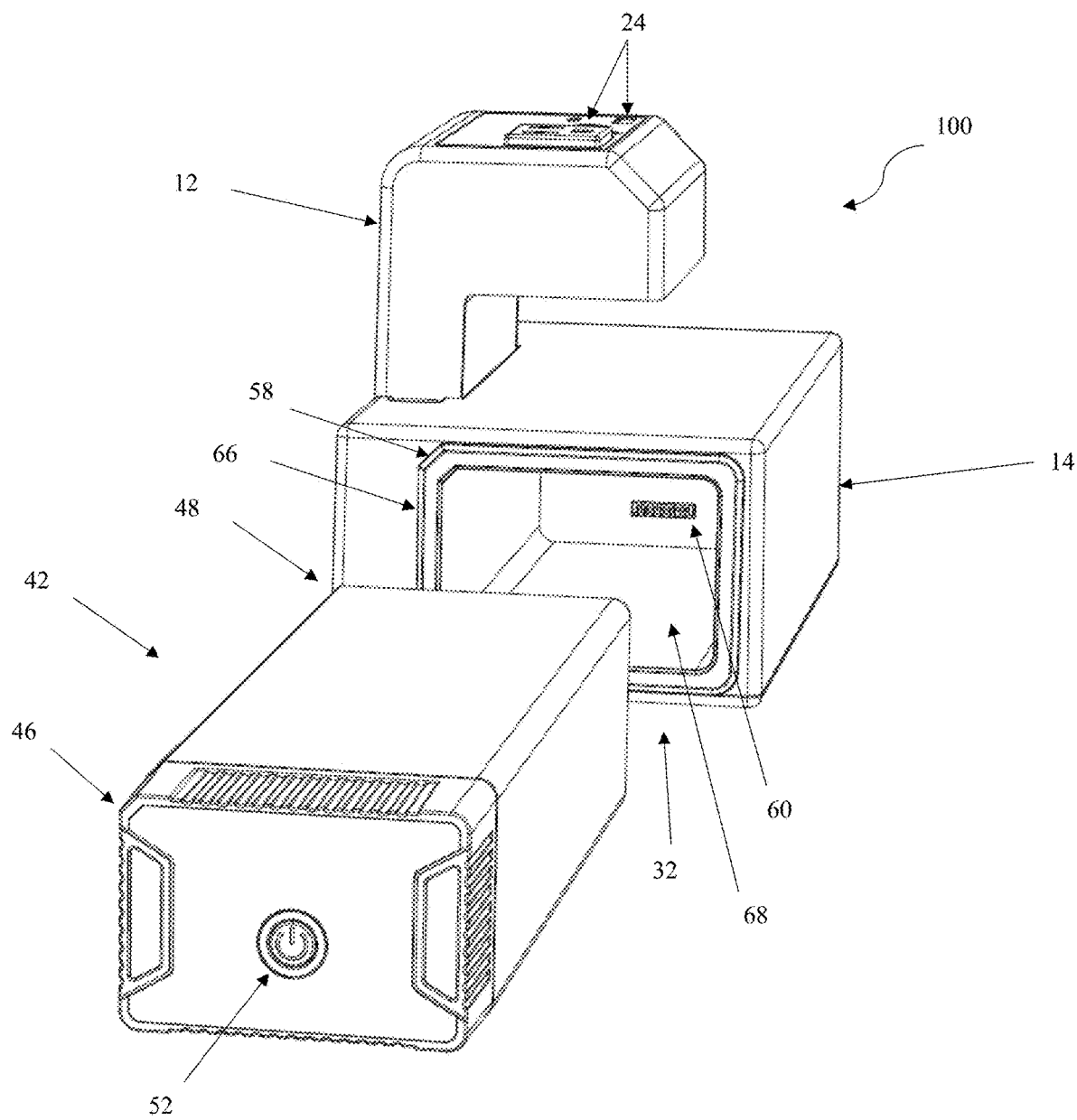
FIG. 8 is a front view of the battery-based wireless power device of FIG. 1 and the rechargeable battery of FIG. 7A.

FIG. 8 shows front views of the battery-based wireless power device 100 and the rechargeable battery 42 immediately prior to insertion into the battery-based wireless power device 100. As can be seen in FIG. 8, the back end 48 of the rechargeable battery 42 is inserted into the opening 68 of the compartment 32 such that the electrical contact points 56 on the back end 48 make an electrical connection with a plurality of electrical contacts 60 on the interior of the compartment 32, thereby allowing current to flow from the rechargeable battery 42 (when turned on) to provide power to the electrical connectors 24. In the illustrated embodiment, the plurality of electrical contacts 60 are positioned at the rear of the compartment 32 so that the plurality of electrical contacts 60 can operably connect to the electrical contact points 56 on the back end 48 upon insertion into the compartment 32. However, the plurality of electrical contacts 60 may be positioned at any location within the compartment 32 so long as the electrical contact points 56 on the rechargeable battery 42 are able to operably connect to the electrical contacts 60.

In one embodiment, the electrical contact points 56 on the rechargeable battery 42 have a custom, anti-theft design that enables the rechargeable battery 42 to be used only with the electrical contacts 60 on the battery-based wireless power device 100. In one embodiment, the electrical contact points 56 may be a unique design of copper prongs. The unique design of the electrical contact points 56 prevents theft of the rechargeable battery 42 and the battery-based wireless power device 100 by allowing only the rechargeable battery 42 having the unique design of electrical contact points 56 to be used in the battery-based wireless power device 100 having a matching connection type.

Figure 9:
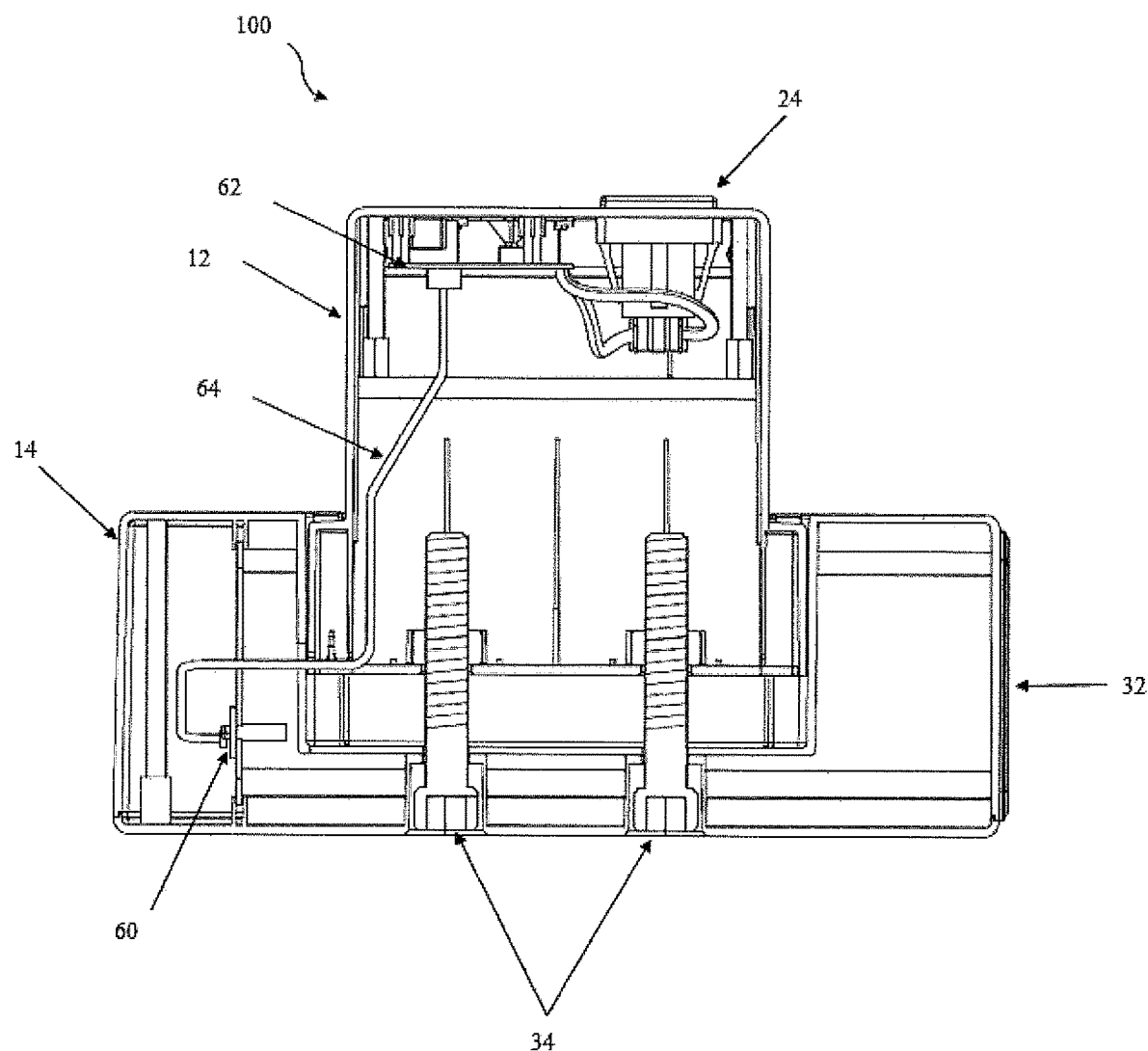
FIG. 9 is an interior view of the battery-based wireless power device of FIG. 1.

FIG. 9 is an interior view of the battery-based wireless power device 100 according to one embodiment showing the circuitry by which power is supplied from the rechargeable battery 42 to the electrical connectors 24. The electrical connectors 24 are operatively connected to a printed circuit board (PCB) 62. The PCB 62 functions as a component to transfer electric signals to the electrical connectors 24. The PCB 62 is operatively connected to the electrical contacts 60 on the interior of the compartment 32, which make an electrical connection with the electrical contact points 56 on the rechargeable battery 42. The PCB 62 may be operatively connected to the electrical contacts 60 by a power cable 64. In another embodiment, the PCB 62 may be operatively connected to the electrical contacts 60 by a bus.

In the illustrated embodiment, a single power cable 64 operatively connects the PCB 62 in the upper housing 12 to the electrical contacts 60 in the lower housing 14. However, in another embodiment, more than one power cable 64 may be used to make an electrical connection between the PCB 62 and the electrical contacts 60 in the compartment 32. For instance, the upper housing may include a second set of electrical contacts 60 such that a first power cable 64 operatively connects the PCB 62 to the second set of electrical contacts 60 and a second power cable 64 operatively connects the second set of electrical contacts 60 to the electrical contacts 60 in the compartment 32.

Figure 10:
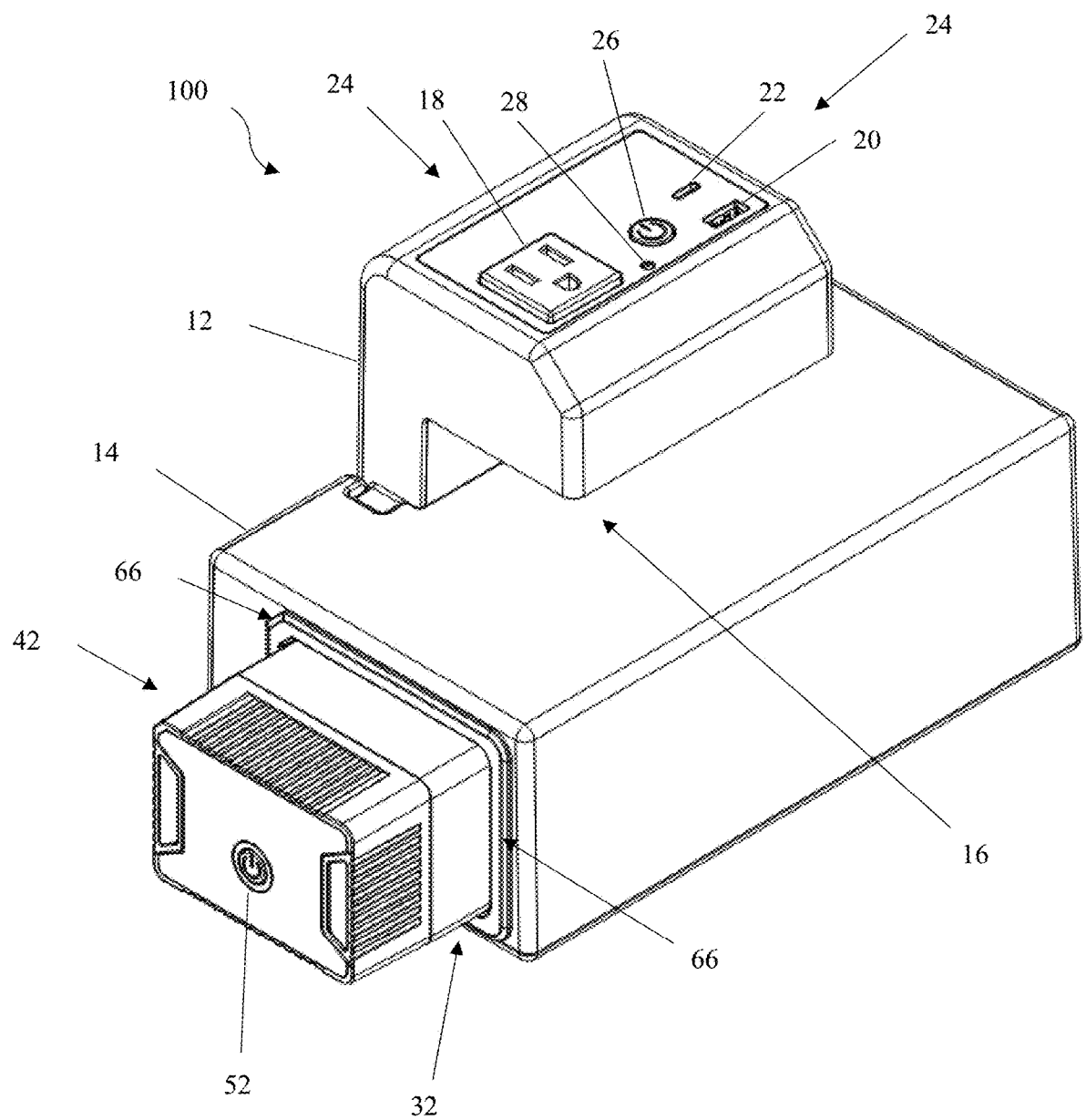
FIG. 10 is a right perspective view of the battery-based wireless power device of FIG. 1 having the rechargeable battery inserted therein.
Figure 18:
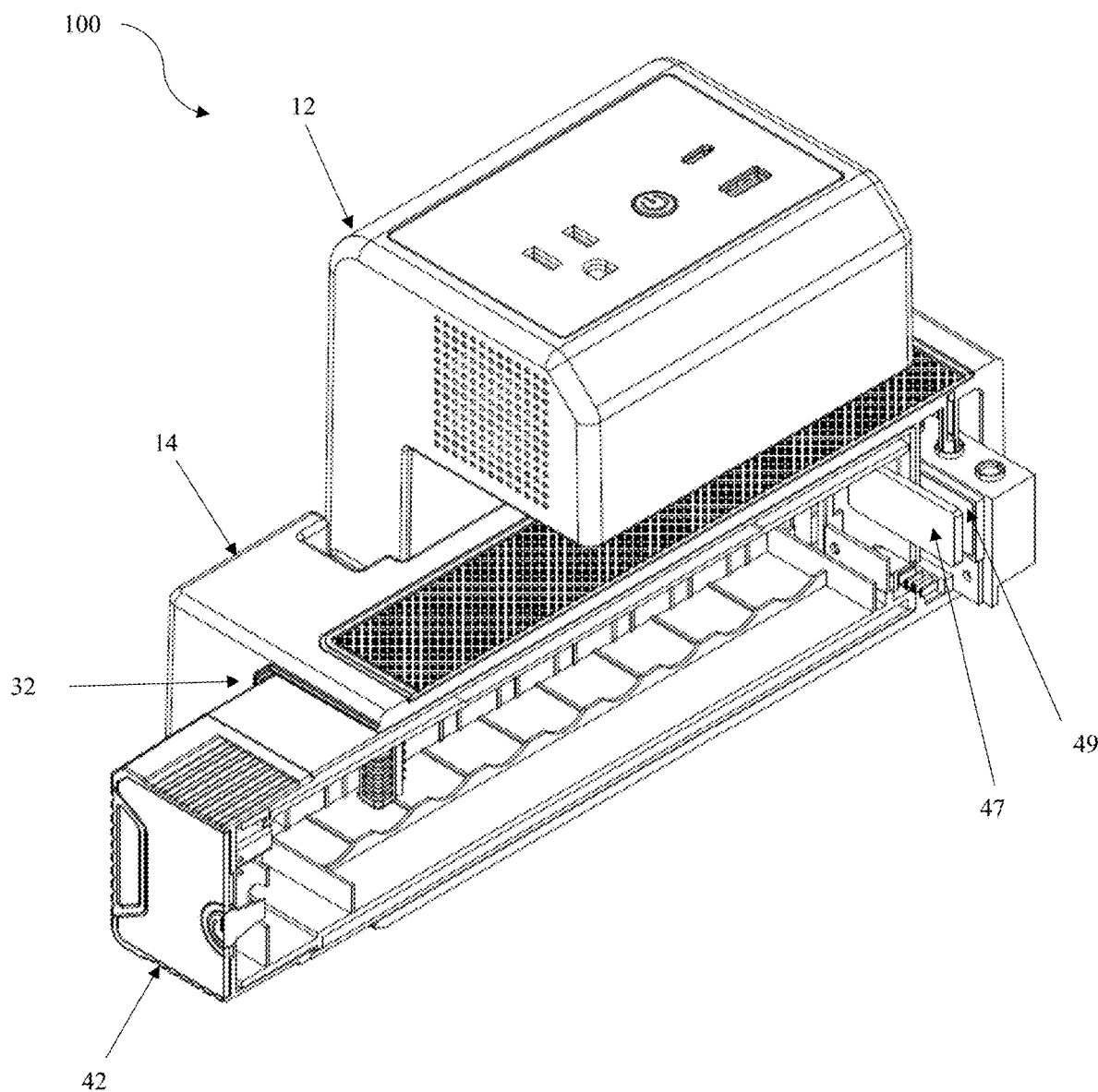
FIG. 18 is a cut-away view of the battery-based wireless power device of FIG. 2 with a rechargeable battery inserted therein.

FIG. 10 shows a right perspective view of the battery-based wireless power device 100 having the rechargeable battery 42 inserted therein. The rechargeable battery 42 may be secured within the compartment 32 by any known securing means so long as the rechargeable battery 42 is removable. For example, the compartment 32 may have latches, clips, snaps, or hooks for securing the rechargeable battery 42 in place. In another embodiment, the rechargeable battery 42 may slide into the compartment 32 and remain in place via a magnetic attraction. In this aspect, as shown in FIG. 18, the lower housing 14 may include an interior magnet 49 that is located in or near the compartment 32. The magnet 49 attracts a metal plate 47 (as shown in FIG. 18) located within the rechargeable battery 42 and holds the rechargeable battery 42 in the compartment 32 via a magnetic attraction. In still another embodiment, the compartment 32 may include one or more security features to limit or preclude unauthorized removal of the rechargeable battery 42 from the battery-based wireless power device 100. For example, the compartment 32 may utilize a locking mechanism for securing the rechargeable battery 42 in which only a specially-shaped key can unlock the rechargeable battery 42 in the battery-based wireless power device 100.

While the battery-based wireless power device 100 has been described herein as supporting a rechargeable electrical power source for providing power to the device 100, the battery-based wireless power device 100 may also be supplied with power via a power cord for insertion into an outlet. In this aspect, a power cord is operatively connected to the battery-based wireless power device 100. This can be advantageous in situations where a rechargeable battery 42 is not available or the rechargeable battery 42 in use is depleted and a fully charged rechargeable battery 42 is unavailable. In another embodiment, both the battery-based wireless power device 100 and the rechargeable battery 42 supported therein can be supplied with power when the device 100 is plugged into an outlet via the power cord. In this aspect, the battery-based wireless power device 100 can supply power while the rechargeable battery 42 charges within the device 100.

Figure 11:
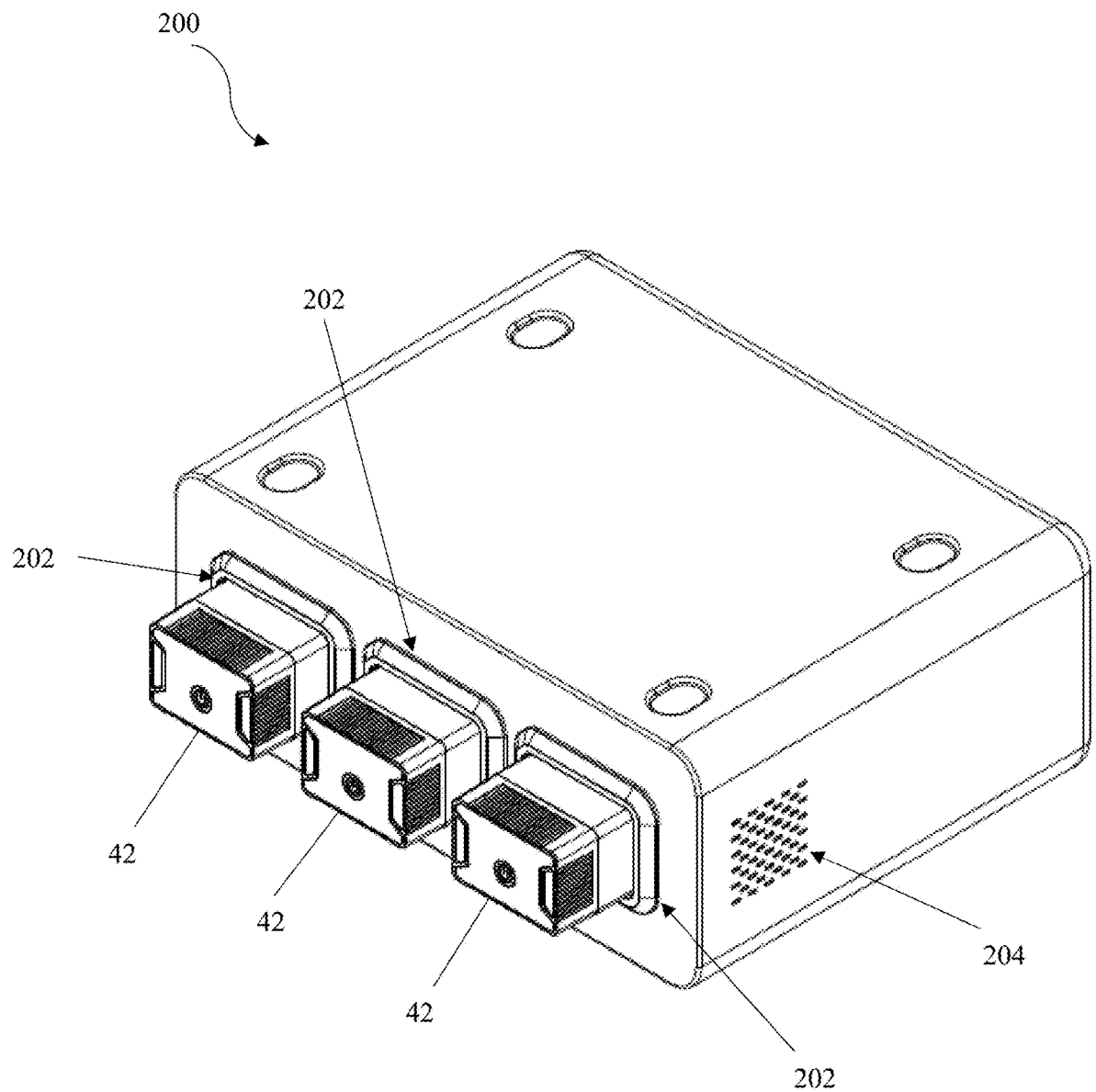
FIG. 11 is a front perspective view of a multi-bay battery charger according to one embodiment of the present disclosure.

The present disclosure also provides multi-bay battery chargers for charging and storing the rechargeable batteries 42. FIG. 11 is a front perspective view of a multi-bay battery charger 200 according to one embodiment of the present disclosure. The present disclosure provides battery chargers for simultaneously recharging one or more rechargeable batteries 42 that are not in use. In the illustrated embodiment of FIG. 11, the multi-bay battery charger 200 includes three charging bays 202 for charging three rechargeable batteries 42. Each bay 202 is configured to receive and electrically engage the electrical contacts 56 of the rechargeable batteries 42. As shown in FIG. 11, the bays 202 are rectangular in shape to complement the rectangular shape of the rechargeable batteries 42. However, it will be appreciated that the bays 202 may be any shape so long as they conform to the shape of the rechargeable battery 42. The multi-bay battery charger 200 may also include one or more ventilation holes 204 along one or more sides to allow for air to circulate within the battery charger 200 and prevent overheating.

Figure 12:
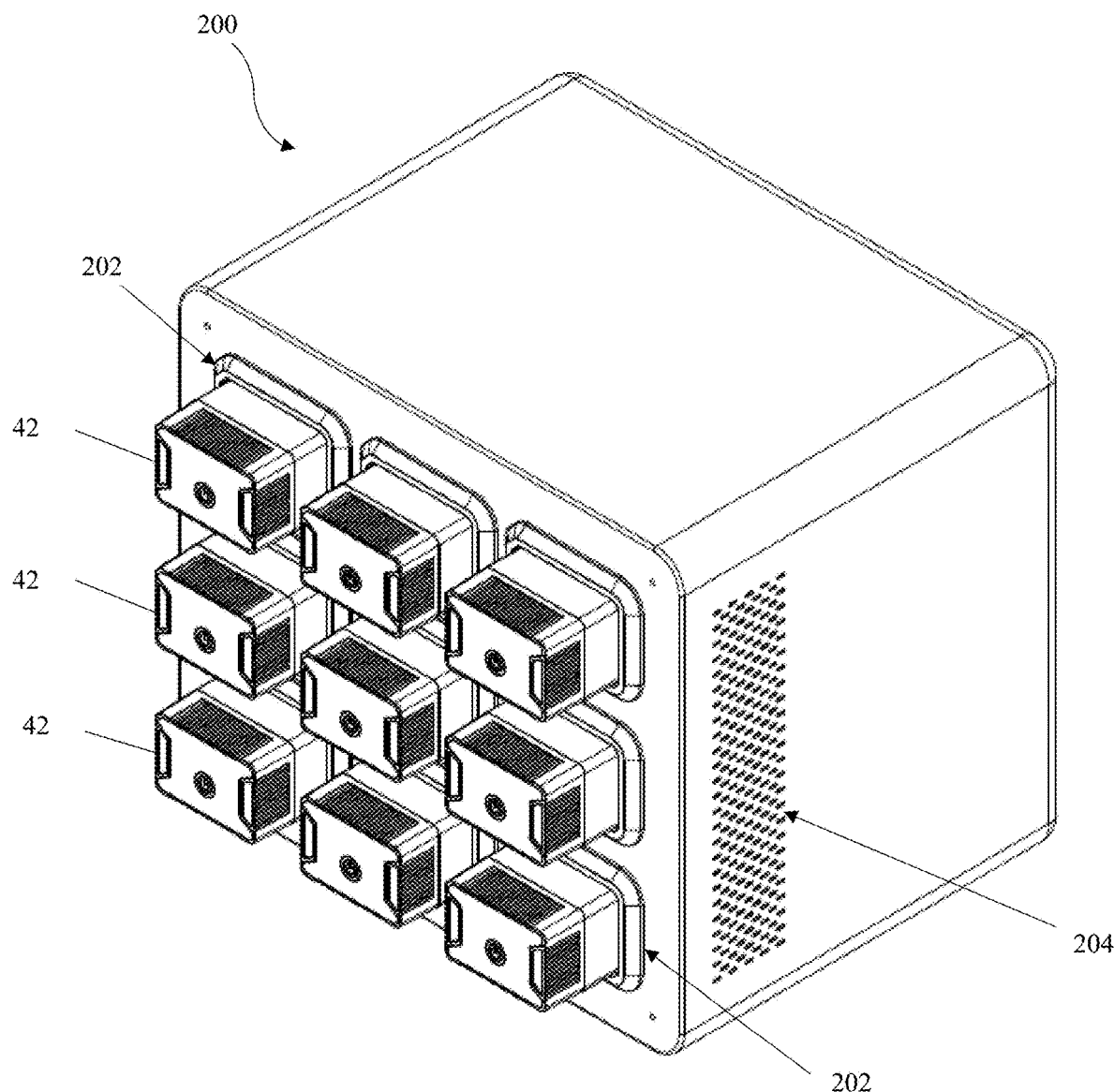
FIG. 12 is a front perspective view of a multi-bay battery charger according to another embodiment of the present disclosure.

FIG. 12 is a front perspective view of a multi-bay battery charger 200 according to another embodiment of the present disclosure. In the illustrated embodiment of FIG. 12, the multi-bay battery charger 200 includes nine bays 202 for receiving and electrically engaging nine rechargeable batteries 42. However, one of ordinary skill in the art will appreciate that the battery chargers 200 may be designed to have any number of bays 202 to accommodate varying amounts of rechargeable batteries 42. As shown in FIG. 12, the multi-bay charger 200 includes one or more ventilation holes 204 extending along one or more sides.

Figure 13:
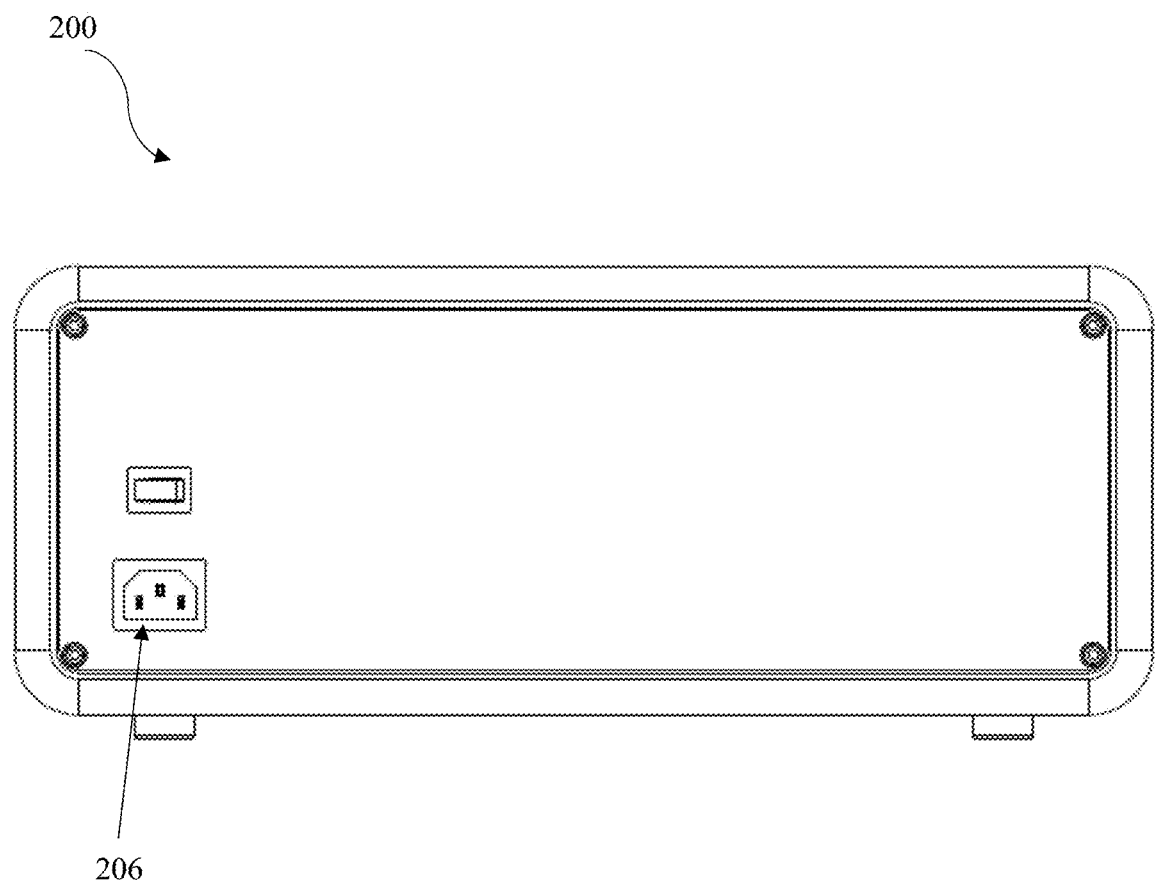
FIG. 13 is a bottom view of a multi-bay battery charger according to one embodiment of the present disclosure.

FIG. 13 is a bottom view of the multi-bay battery charger 200 according to one embodiment. As shown in FIG. 13, a power outlet 206 may be mounted onto the battery charger 200 so that power can be supplied directly to the battery charger 200. In another embodiment, the battery chargers 200 described herein may be supplied with electrical power via a power cord (not shown). In this aspect, the battery chargers 200 may include a power cord attached thereto that can be plugged into a power source. In still another embodiment, the battery chargers 200 may include one or more security features to prevent theft of the rechargeable batteries 42. For example, the battery chargers 200 may be equipped with a door that can be locked to secure the rechargeable batteries 42 during charging.

While the battery-based wireless power device 100 has been described herein as having upper housing 12 and lower housing 14 in the form a clamp, the design of the battery-based wireless power device 100 may be modified to accommodate other mechanisms for mounting the battery-based wireless power device 100 onto furniture. For example, the battery-based wireless power device 100 may be mounted using any removable attachment means, such as brackets, screws, pins, rods, and projections.

Figure 14:
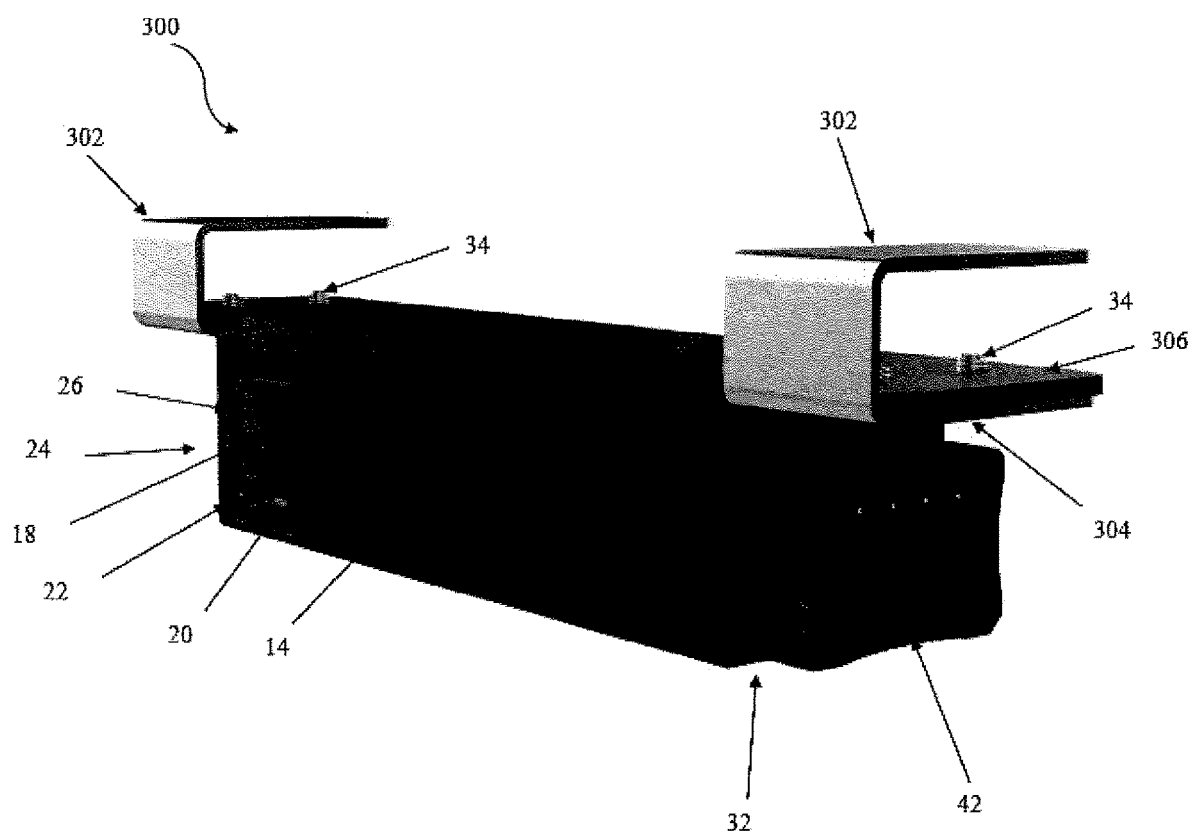
FIG. 14 is a perspective view of a battery-based wireless power device in accordance with another embodiment of the present disclosure.

FIG. 14 is a perspective view of a battery-based wireless power device 300 according to another embodiment of the present disclosure. The battery-based wireless power device 300 shown in FIG. 14 dispenses of the need for an upper housing. In this aspect, the battery-based wireless power device 300 is formed in the lower housing 14 only. However, in other embodiments, the battery-based wireless power device 300 may be formed in the upper housing 12 only. The lower housing 14 supports, for example, the one or more electrical connectors 24 and the power button 26. The one or more electrical connectors 24 and the power button 26 may be located anywhere on the outside of the lower housing 14 so long as the electrical connectors 24, such as the AC outlet 18, the USB-A plug 20, and the USB-C plug 22, and the power button 26 are accessible to the user. Since the electrical connectors 24 are formed within the lower housing 14, the printed circuit board (PCB) (not shown) may be housed within the interior of the lower housing 14. The electrical connectors 24 and the power button 26 are operatively connected to the PCB. As described above, the lower housing 14 also includes the compartment 32 for receiving and supporting the rechargeable battery 42.

FIG. 14 also shows another embodiment of a mechanism for mounting the battery-based wireless power device 300 onto a furniture article. As shown in FIG. 14, the battery-based wireless power device 300 may include one or more brackets 302. Each of the one or more brackets 302 is configured to fit the side edge or lip of a furniture article. In the illustrated embodiment, there are two brackets 302—one operatively attached to each end of the lower housing 14. However, any number of brackets 302 may be used for mounting the battery-based wireless power device 300. The brackets 302 may be formed from any suitable rigid material such as aluminum, stainless steel, or plastic.

As can be seen in FIG. 14, the brackets 302 are operatively connected to the lower housing 14 via one or more holding members 34. To secure the brackets 302 to the lower housing 14, the holding members 34 are inserted upward through one or more holes (not shown) in a bottom side 304 of the bracket 302 and one or more holes (not shown) in an extended upper ledge 306 of the lower housing 14. The holding members 34 may have threaded shafts that rotatably engage threaded holes (not shown) on the bracket 302 and threaded holes (not shown) in the lower housing 14. In the illustrated embodiment, the holding members 34 are threaded screws. However, the holding members 34 may include any type of securing means, such as bolts, pins, rods, and projections.

Figure 15:
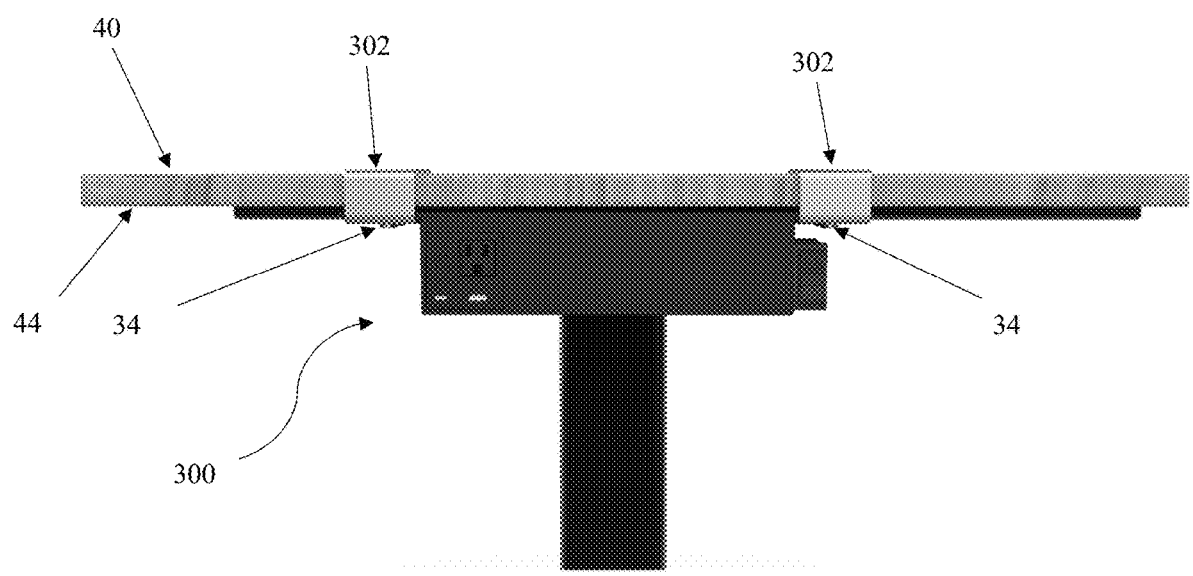
FIG. 15 depicts the battery-based wireless power device of FIG. 14 mounted onto a furniture article.

FIG. 15 is a perspective view of the battery-based wireless power device 300 mounted onto a furniture article 40, such as a table or desk. The battery-based wireless power device 300 is mounted onto the furniture article 40 through the use of the brackets 302. Brackets 302 are fitted to the edge of the furniture article 40 and are secured to the bottom surface 44 of the furniture article 40 via the holding members 34. In one embodiment, the holding members 34 engage one or more holes (not shown) on the bottom surface 44 of the furniture article 40 such that each of the holding members 34 are screwed into the furniture article 40.

Figure 16:
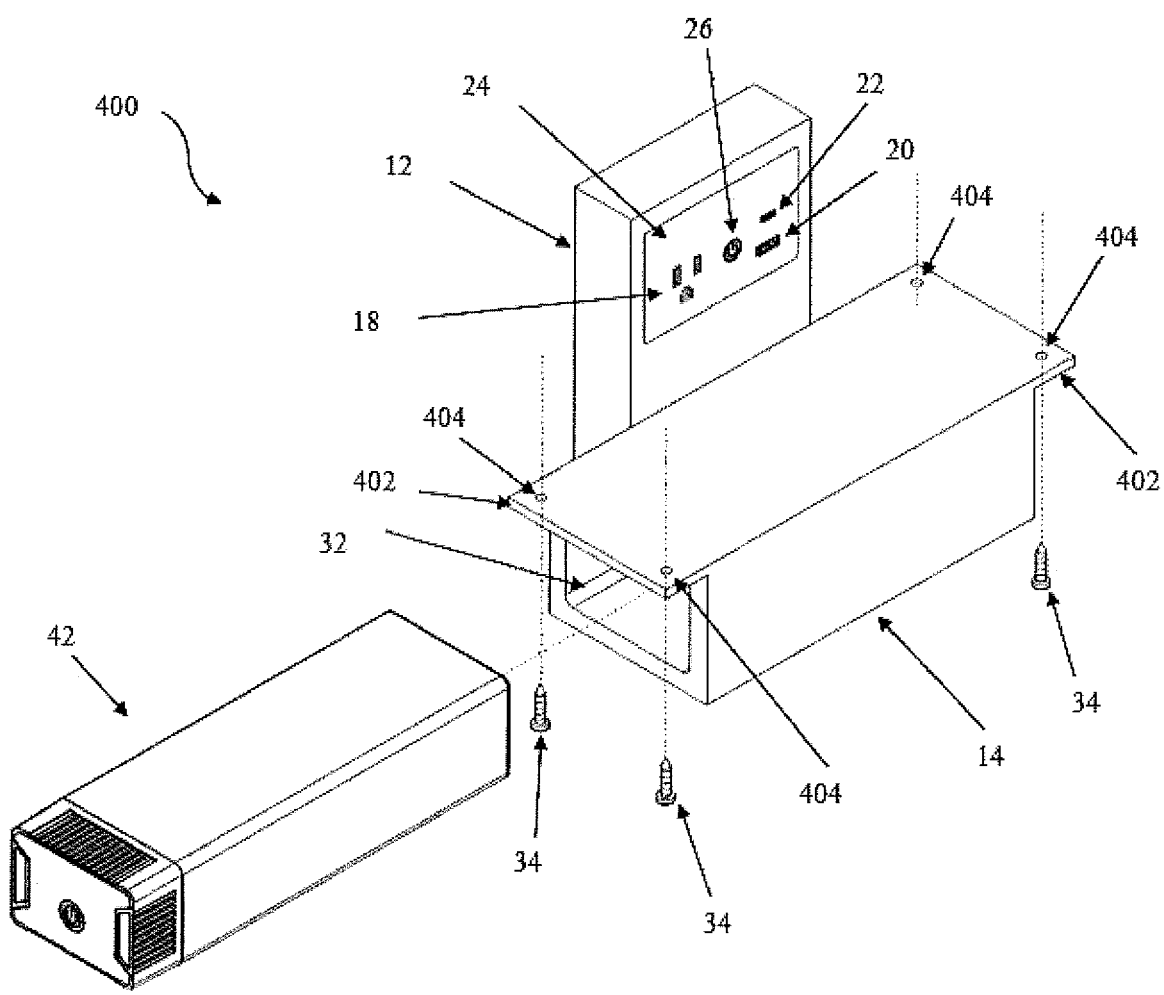
FIG. 16 is a perspective view of a battery-based wireless power device in accordance with yet another embodiment of the present disclosure.

FIG. 16 is a perspective view of a battery-based wireless power device 400 according to still another embodiment of the present disclosure. The battery-based wireless power device 400 shown in FIG. 16 includes the upper housing 12 and the lower housing 14. However, in this embodiment, the upper housing 12 is a substantially vertical structure that is operatively attached to the lower housing 14 in a perpendicular manner. The upper housing 12 supports, for example, the one or more electrical connectors 24 and the power button 26. The one or more electrical connectors 24 and the power button 26 may be located anywhere on the upper housing 12 so long as the electrical connectors 24, such as the AC outlet 18, the USB-A plug 20, and the USB-C plug 22, and the power button 26 are accessible to the user. The printed circuit board (PCB) (not shown) may be housed within the interior of the upper housing 12. The electrical connectors 24 and the power button 26 are operatively connected to the PCB. As described above, the lower housing 14 includes the compartment 32 for receiving and supporting the rechargeable battery 42.

FIG. 16 shows yet another embodiment of a mechanism for mounting the battery-based wireless power device 400 onto a furniture article. As shown in FIG. 16, the lower housing 14 may have one or more upper extended ledges 402 that can be directly attached to a furniture article. The one or more upper extended ledges 402 may include one or more holes 404, such as threaded or smooth-bore holes, for engagement of a holding member 34. To secure the lower housing 14 to the furniture article, the holding members 34 are inserted upward through the one or more holes 404, as shown in FIG. 16. In one embodiment, the holding members 34 may have threaded shafts that rotatably engage threaded holes 404. In the illustrated embodiment, the holding members 34 are threaded screws. However, the holding members 34 may include any type of securing means, such as bolts, pins, rods, and projections.

Figure 17:
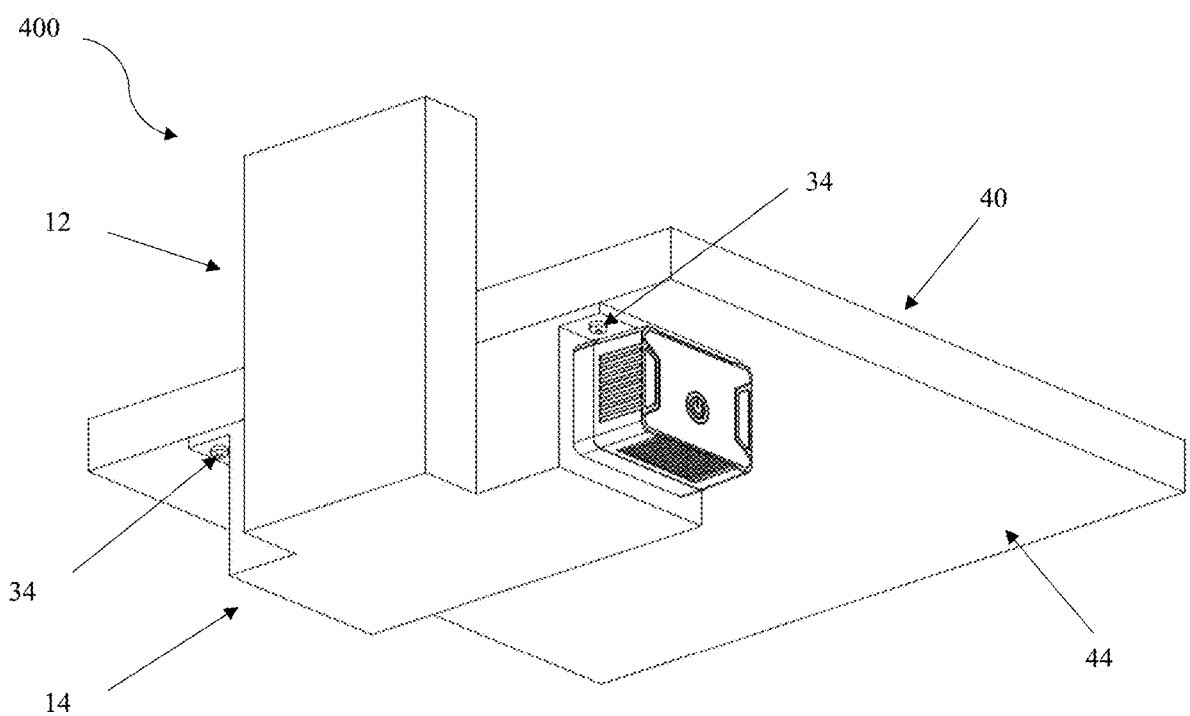
FIG. 17 depicts the battery-based wireless power device of FIG. 16 mounted onto a furniture article.

FIG. 17 is a perspective view of the battery-based wireless power device 400 mounted onto the furniture article 40, such as a table or desk. The battery-based wireless power device 400 is secured to the furniture article 40 by holding members 34. More particularly, the lower housing 14 is directly attached to the bottom surface 44 of the furniture article 40 via the holding members 34. In one embodiment, the holding members 34 engage one or more holes (not shown) on the bottom surface 44 of the furniture article 40 such that each of the holding members 34 are screwed into the furniture article 40.

Other configurations are contemplated for attachment of the battery-based wireless power device 100. For example, one or more brackets may be permanently attached to the furniture article. The battery-based wireless power device 100 may be secured to the attached brackets by, for example, a sliding mechanism, clipping mechanism, or a hook-and-loop fastener.

The various components of the battery-based wireless power device 100 and the rechargeable battery 42 described herein may be constructed or manufactured from materials, such as various polymers, plastics, stainless steel, and aluminum. Similarly, the various parts described herein may be constructed according to various manufacturing methods including injection molding, milling, forging, extrusion, pressing, 3D printing, and other related manufacturing methods.

The device described and claimed herein is not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A battery-based power device for clamping onto a furniture article, comprising:
    an upper housing defining an interior region, the interior region comprising at least one electrical connector mounted therein and accessible from outside the upper housing;
    a lower housing operatively connected to the upper housing, wherein the upper housing and the lower housing are positioned substantially parallel to one another and define a mounting cavity therebetween configured for removable attachment to an edge of the furniture article,
    a compartment defined within the lower housing for receiving a rechargeable electrical power source having an outer housing, the compartment comprising a plurality of electrical contacts operably connected to the at least one electrical connector and an opening dimensioned to receive the outer housing of the rechargeable electrical power source therein, wherein the opening dimensioned to receive the outer housing of the rechargeable electrical power source therein is positioned below the edge of the furniture article,
    wherein the upper housing and the lower housing are adjustable in a first clamping direction toward a surface of the furniture article and in a second opposite clamping direction away from the surface of the furniture article by at least one rotatable holding member that extends upward from the lower housing to the upper housing.

2. The battery-based power device of claim 1, wherein the at least one electrical connector comprises an AC outlet, a USB-C plug, a USB-A plug, or combinations thereof.

3. The battery-based power device of claim 1, wherein the interior region further comprises at least one of a power button or a power indicator light mounted therein.

4. The battery-based power device of claim 1, wherein the opening has an exterior frame comprising at least one corner having an alignment notch.

5. The battery-based power device of claim 1, wherein the mounting cavity has a height of about 2 inches or less.

6. The battery-based power device of claim 1, wherein the at least one rotatable holding member is a threaded screw or bolt having a hex-shaped head configured for engagement by a wrench.

7. The battery-based power device of claim 1, wherein the at least one electrical connector is operatively connected to a printed circuit board (PCB) and the PCB is operatively connected to the plurality of electrical contacts.

8. A battery-based power device for clamping onto a furniture article, comprising:
 an upper housing defining an interior region, the interior region comprising at least one electrical connector mounted therein and accessible from outside the upper housing, wherein the at least one electrical connector comprises an AC outlet, a USB-C plug, a USB-A plug, or combinations thereof;
 a lower housing operatively connected to the upper housing, wherein the upper housing and the lower housing are positioned substantially parallel to one another and define a mounting cavity therebetween configured for removable attachment to an edge of the furniture article,
 a compartment defined within the lower housing, the compartment having an opening for receiving a rechargeable electrical power source having an outer housing, wherein the compartment comprises a plurality of electrical contacts operably connected to the at least one electrical connector and the opening is dimensioned to receive the outer housing of the rechargeable electrical power source therein, wherein the opening dimensioned to receive the outer housing of the rechargeable electrical power source therein is positioned below the edge of the furniture article,
 wherein the lower housing and the upper housing are made adjustable for clamping onto the edge of the furniture article by use of at least one rotatable tightening screw, wherein, upon rotation in a first rotational direction, the at least one rotatable tightening screw is configured to move longitudinally in a first clamping direction toward a surface of the furniture article and, upon rotation in a second rotational direction, the at least one rotatable tightening screw is configured to move longitudinally in a second clamping direction away from the surface of the furniture article.

9. The battery-based power device of claim 8, wherein the interior region further comprises a power button and a power indicator light mounted therein, wherein the power indicator light is a light-emitting diode (LED), a light, or a digital readout.

10. The battery-based power device of claim 8, wherein the plurality of electrical contacts in the compartment are operably connected to the at least one electrical connector by a power cord or bus.

11. The battery-based power device of claim 8, wherein the lower housing and the upper housing are operatively connected by at least two rotatable tightening screws and the at least two rotatable tightening screws extend upward through the lower housing and the upper housing.

12. The battery-based power device of claim 8, wherein the opening has an exterior frame comprising at least one corner having an alignment notch.

13. The battery-based power device of claim 8, wherein the mounting cavity has a height of about 1.5 inches or less.

14. The battery-based power device of claim 8, wherein the plurality of electrical contacts are positioned on an interior surface of the compartment opposing the opening.

15. A kit for providing power at a furniture article, comprising:
 the battery-based power device of claim 1; and
 at least one rechargeable battery.

16. The kit of claim 15, wherein the rechargeable battery is a lithium ion battery.

17. The kit of claim 15, wherein the rechargeable battery comprises a plurality of electrical contact points configured to operably connect to the plurality of electrical contacts in the compartment.

18. The kit of claim 15, further comprising a battery charger configured to support and recharge the at least one rechargeable battery.

19. The kit of claim 18, wherein the battery charger is a multi-bay battery charger configured to support and recharge a plurality of rechargeable batteries.

20. A battery-based power device for attachment onto a furniture article, comprising:
 a housing defining an interior region, the interior region comprising at least one electrical connector mounted therein and accessible from outside the housing;
 a compartment defined within the housing for receiving a rechargeable electrical power source having an outer housing, the compartment comprising a plurality of electrical contacts operably connected to the at least one electrical connector and an opening dimensioned to receive the outer housing of the rechargeable electrical power source therein,
 one or more brackets operably attached to the housing and configured for removable attachment to an edge of the furniture article, wherein the opening dimensioned to receive the outer housing of the rechargeable electrical power source therein is positioned below the edge of the furniture article,
 wherein the one or more brackets are configured for attachment to the edge of the furniture article by at least one rotatable holding member.

* * * * *